US007962293B2

(12) United States Patent
Gysling

(10) Patent No.: US 7,962,293 B2
(45) Date of Patent: Jun. 14, 2011

(54) APPARATUS AND METHOD FOR PROVIDING A STRATIFICATION METRIC OF A MULTIPHASE FLUID FLOWING WITHIN A PIPE

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 269 days.

(21) Appl. No.: 12/139,613

(22) Filed: Jun. 16, 2008

(65) Prior Publication Data
US 2008/0276723 A1    Nov. 13, 2008

Related U.S. Application Data

(63) Continuation-in-part of application No. 11/934,282, filed on Nov. 2, 2007, now Pat. No. 7,516,024, which is a continuation of application No. 11/077,709, filed on Mar. 10, 2005, now abandoned.

(60) Provisional application No. 60/944,165, filed on Jun. 15, 2007.

(51) Int. Cl.
G01F 1/76      (2006.01)
G01F 1/00      (2006.01)
G01F 13/00     (2006.01)
G01F 22/00     (2006.01)
G06F 19/00     (2011.01)

(52) U.S. Cl. ........... 702/45; 73/195; 73/196; 73/861.04; 73/861.32; 340/606; 702/48; 702/187; 702/189

(58) Field of Classification Search .................... 73/195, 73/196, 861, 861.04, 861.18, 861.21, 861.22, 73/861.23, 861.27, 861.32; 137/551; 340/500, 340/540, 603, 605, 606; 702/1, 33, 45, 47, 702/48, 50, 54, 56, 127, 187, 188, 189
See application file for complete search history.

(56) References Cited

U.S. PATENT DOCUMENTS
3,543,565 A * 12/1970 De Koning et al. .......... 73/61.78
(Continued)

FOREIGN PATENT DOCUMENTS
CA    2335723    4/1994
(Continued)

OTHER PUBLICATIONS

Gibson, Jr. et al: "Viscous Attenuation of Acoustic Waves in Suspensions", May 1989, Earth Resources Laboratory Department of Earth, Atmospheric, and Planetary Sciences Massachusetts Institute of Technology Cambridge, MA 02139, pp. 156-186.*

(Continued)

*Primary Examiner* — Edward R Cosimano
(74) *Attorney, Agent, or Firm* — O'Shea Getz P.C.

(57) ABSTRACT

A method and apparatus for determining a level of stratification of a multiphase fluid flow passing through a pipe is provided. The method includes, and the apparatus is operable to perform, the steps of: 1) determining a flow velocity of the multiphase fluid flow passing through a first radial region of the pipe; 2) determining a flow velocity of a portion of the multiphase fluid flow passing within a second radial region of the pipe, wherein the second radial region is above the first radial region; and 3) comparing the flow velocity from the first radial region and flow velocity from the second radial region to determine information indicative of the stratification of the multiphase fluid flow.

12 Claims, 21 Drawing Sheets

U.S. PATENT DOCUMENTS

| | | | |
|---|---|---|---|
| 3,548,637 A * | 12/1970 | Wicks | 73/54.01 |
| 3,940,985 A | 3/1976 | Wyler | |
| 3,987,674 A | 10/1976 | Baumoel | |
| 4,015,470 A | 4/1977 | Morrison | |
| 4,248,085 A | 2/1981 | Coulthard | |
| 4,317,178 A * | 2/1982 | Head | 702/47 |
| 4,432,243 A | 2/1984 | Lowell et al. | |
| 4,445,389 A | 5/1984 | Potzick et al. | |
| 4,896,540 A | 1/1990 | Shakkottia et al. | |
| 5,040,415 A | 8/1991 | Barkhoudarian | |
| 5,083,452 A | 1/1992 | Hope | |
| 5,307,688 A * | 5/1994 | Lefebvre | 73/861.16 |
| 5,367,911 A | 11/1994 | Jewell et al. | |
| 5,396,806 A * | 3/1995 | Dechene et al. | 73/861.04 |
| 5,398,542 A | 3/1995 | Vasbinder | |
| 5,531,124 A * | 7/1996 | Kim et al. | 73/861.27 |
| 5,546,813 A | 8/1996 | Hastings et al. | |
| 5,591,922 A | 1/1997 | Segeral et al. | |
| 5,597,962 A * | 1/1997 | Hastings et al. | 73/861.29 |
| 5,639,972 A * | 6/1997 | Hastings et al. | 73/862.29 |
| 5,708,211 A | 1/1998 | Jepson et al. | |
| 5,770,805 A | 6/1998 | Castel | |
| 5,770,806 A | 6/1998 | Hiismaki | |
| 5,856,622 A | 1/1999 | Yamamoto et al. | |
| 5,929,342 A | 7/1999 | Thompson et al. | |
| 5,948,959 A | 9/1999 | Peloquin | |
| 6,202,494 B1 | 3/2001 | Riebel et al. | |
| 6,354,147 B1 | 3/2002 | Gysling et al. | |
| 6,386,018 B1 | 5/2002 | Letton et al. | |
| 6,397,683 B1 | 6/2002 | Hagenmeyer et al. | |
| 6,435,030 B1 | 8/2002 | Gysling et al. | |
| 6,450,037 B1 | 9/2002 | Davis et al. | |
| 6,460,419 B2 | 10/2002 | Su | |
| 6,474,174 B2 | 11/2002 | Su | |
| 6,536,291 B1 | 3/2003 | Gysling et al. | |
| 6,587,798 B2 | 7/2003 | Gysling et al. | |
| 6,601,458 B1 | 8/2003 | Gysling et al. | |
| 6,609,069 B2 | 8/2003 | Gysling | |
| 6,691,584 B2 | 2/2004 | Gysling et al. | |
| 6,732,575 B2 | 5/2004 | Gysling et al. | |
| 6,782,150 B2 | 8/2004 | Davis et al. | |
| 6,813,962 B2 | 11/2004 | Gysling et al. | |
| 6,862,920 B2 | 3/2005 | Gysling et al. | |
| 6,889,562 B2 | 5/2005 | Gysling et al. | |
| 6,898,541 B2 | 5/2005 | Gysling et al. | |
| 6,959,604 B2 | 11/2005 | Davis et al. | |
| 6,988,411 B2 | 1/2006 | Gysling et al. | |
| 7,032,432 B2 | 4/2006 | Gysling et al. | |
| 7,261,002 B1 * | 8/2007 | Gysling et al. | 73/861.42 |
| 7,330,797 B2 * | 2/2008 | Bailey et al. | 702/50 |
| 7,516,024 B2 * | 4/2009 | Gysling | 702/48 |
| 7,587,948 B2 * | 9/2009 | Gysling et al. | 73/861.42 |
| 7,603,916 B2 * | 10/2009 | Gysling | 73/861.42 |
| 7,607,358 B2 * | 10/2009 | Atkinson et al. | 73/861.12 |
| 7,657,392 B2 * | 2/2010 | Gysling | 702/128 |
| 2002/0011120 A1 | 1/2002 | Huang | |
| 2002/0050176 A1 | 5/2002 | Su | |
| 2002/0053243 A1 | 5/2002 | Su | |
| 2002/0123852 A1 * | 9/2002 | Gysling et al. | 702/100 |
| 2002/0129662 A1 * | 9/2002 | Gysling et al. | 73/861.42 |
| 2002/0134144 A1 | 9/2002 | Gysling et al. | |
| 2002/0152802 A1 | 10/2002 | Gysling et al. | |
| 2002/0194932 A1 * | 12/2002 | Gysling et al. | 73/861.42 |
| 2003/0154036 A1 | 8/2003 | Gysling et al. | |
| 2004/0069069 A1 | 4/2004 | Croteau et al. | |
| 2004/0144182 A1 | 7/2004 | Gysling et al. | |
| 2004/0168522 A1 | 9/2004 | Bailey et al. | |
| 2004/0168523 A1 | 9/2004 | Bailey et al. | |
| 2004/0199340 A1 | 10/2004 | Gysling et al. | |
| 2004/0226386 A1 | 11/2004 | Croteau et al. | |
| 2004/0231431 A1 | 11/2004 | Bailey et al. | |
| 2005/0000289 A1 | 1/2005 | Gysling et al. | |
| 2005/0005711 A1 | 1/2005 | Gysling et al. | |
| 2005/0005712 A1 | 1/2005 | Gysling et al. | |
| 2005/0005713 A1 * | 1/2005 | Winston et al. | 73/861.42 |
| 2005/0011283 A1 | 1/2005 | Davis et al. | |
| 2005/0011284 A1 | 1/2005 | Gysling et al. | |
| 2005/0033545 A1 | 2/2005 | Gysling | |
| 2005/0044929 A1 | 3/2005 | Gysling et al. | |
| 2005/0125166 A1 | 6/2005 | Davis et al. | |
| 2005/0159904 A1 | 7/2005 | Loose et al. | |
| 2005/0246111 A1 * | 11/2005 | Gysling et al. | 702/45 |
| 2006/0144148 A1 | 7/2006 | Gysling et al. | |
| 2007/0005272 A1 * | 1/2007 | Gysling | 702/50 |
| 2007/0022824 A1 | 2/2007 | Bailey et al. | |
| 2007/0083340 A1 * | 4/2007 | Bailey et al. | 702/100 |
| 2008/0000307 A1 * | 1/2008 | Gysling et al. | 73/861.44 |
| 2008/0133182 A1 * | 6/2008 | Gysling | 702/189 |
| 2009/0229375 A1 * | 9/2009 | Atkinson et al. | 73/861.18 |

FOREIGN PATENT DOCUMENTS

| | | |
|---|---|---|
| EP | 0305609 | 3/1989 |
| EP | 1186868 | 3/2002 |
| FR | 2561378 | 9/1985 |
| GB | 2282931 | 4/1995 |
| WO | WO 93/14382 | 7/1993 |
| WO | WO 2004/065912 | 8/2004 |

OTHER PUBLICATIONS

Beranek et al: "Chapter 14.6 Turbulent Boundary Layer Noise" of Noise and Vibration Control Engineering Principles and Applications, Edited by Beranek et al, Aug. 1992, pp. 537-541.*

Lee et al: "Development of an array of pressure sensors with PVDF film", Experiments in Fluids 26, Jan. 8, 1999, pp. 27-35.*

Measurement Specialties: "Piezo Film Sensors Technical Manual", Apr. 2, 1999, Measurement Specialties, Inc. Sensor Products Division 950 Forge Avenue Norristown, PA 19403, (89 pages).*

Gysling et al: "Sonar-Based Volumetric Flow Meter for Pulp and Paper Applications", Dec. 13, 2002, CiDRA Corporation 50 Barnes Park North Wallingford, CT 06492, (5 pages).*

Gysling et al: "Sonar-Based Volumetric Flow Meter for Chemical and Petrochemical Applications", Feb. 14, 2003, CiDRA Corporation 50 Barnes Park North Wallingford, CT 06492, (8 pages).*

Boyes: "New Flowmeter Principle" Flow Control Magazine, Oct. 2003, p. 75.*

Gysling et al: "Clamp-On, Sonar-Based Entrained Air Measurment for Pulp and Paper Applications", Jan. 28, 2004, CiDRA Corporation 50 Barnes Park North Wallingford, CT 06492, (4 pages).*

Gysling et al: Sonar gets into flow New types of meters for chemical industry, Modern Process, pp. 14-16, (No Date).*

Gysling et al. "Sonar Based Volumetric Flow and Entrained Air Measurement for Pulp and Paper Applications", CiDRA Corporation, Jun. 24, 2003.

"ICASE Piezoelectric Polymers", Langley Research Center, Dec. 2001.

Carlson, Johan. "Mass Fraction Measurements in Multiphase Flows Using a Clamp-on PVDF Array", IEEE Ultrasonics Symposium Proceedings, vol. 1, Apr. 18, 2001, pp. 471-474.

Krim et al. "Two Decades of Array Signal Processing Research", IEEE Signal Processing Magazine, Jul. 1996, p. 67-94.

Heywood et al. "Flow in Pipes Part 2: Multiphase Flow", Phys. Technol., vol. 15, 1984, pp. 291-300 and 314.

* cited by examiner

APPARATUS AND METHOD FOR PROVIDING A STRATIFICATION METRIC OF A MULTIPHASE FLUID FLOWING WITHIN A PIPE

CROSS-REFERENCE TO RELATED PATENT APPLICATIONS

The present application is a Continuation-In-Part of U.S. patent application Ser. No. 11/934,282 filed Nov. 2, 2007, now U.S. Pat. No. 7,516,024, which is a Continuation of U.S. patent application Ser. No. 11/077,709 filed Mar. 10, 2005, now abandoned, and claims the benefit of U.S. Provisional Patent Application No. 60/944,165, filed Jun. 15, 2007.

TECHNICAL FIELD

This invention relates to a method and apparatus for measuring parameters such as velocity, level of stratification, volumetric flow rate, and stratification metric of a stratified multiphase flow within a pipe.

BACKGROUND

Many industrial fluid flow processes involve the transportation of a high mass fraction of high density, solid materials through a pipe. For example, a process known as hydrotransport is used in many industries to move solids from one point to another. In this process, water is added to the solids and the resulting mixture is pumped through typically large diameter pipes.

Operation of a hydrotransport line typically involves some degree of stratification, where flow velocity near the bottom of the pipe is less than flow velocity near the top of the pipe. The level of stratification in this flow (i.e., the degree of skew in the velocity profile from the top of the pipe to the bottom of the pipe, where the terms "top" and "bottom" and "upper" and "lower" are relative to one another such that a gravitational force vector may be described as extending from the top toward the bottom, or from upper to lower) is dependent on numerous material and process parameters, such as flow rate, density, pipe size, particle size, and the like. If the level of stratification extends to the point where deposition velocity is reached, the solids begin to settle to the bottom of the pipe, and if the condition is undetected and persists, complete blockage of the pipe can occur, resulting in high costs associated with process downtime, clearing of the blockage, and repair of damaged equipment.

To reduce the chance of costly blockage formation, current practice is to operate the pipeline at a flow velocity significantly above the critical deposition velocity. However, this technique has two significant drawbacks due to operating at higher velocities: it causes higher energy usage due to higher friction losses, and it causes higher pipe wear due to abrasion between the solids and the pipe inner surface. This technique may also be undesirable to due high water consumption. A reliable means of measuring parameters such as velocity, level of stratification, and volumetric flow rate of a stratified flow would enable operating the pipeline at a lower velocity, resulting in energy savings and lower pipe wear.

Various technologies exist for measuring physical parameters of an industrial flow process. Such physical parameters may include, for example, volumetric flow rate, composition, consistency, density, and mass flow rate. While existing technologies may be well-suited for aggressive, large diameter flows, these technologies may be unsuitable for stratified flows, which can adversely affect accuracy in measuring physical parameters of the flow.

Several non-commercial techniques for determining the onset of solids deposition in slurry pipelines are described in recent literature. For example, one technique uses a commercial clamp-on ultrasonic flow meter, in Doppler mode, with coded transmissions and cross-correlation detection. The detection point for the meter is set at a certain pipe level, e.g., 10% above the pipe invert (i.e., the pipe bottom for horizontal pipes). Cross-correlation of a time-gated ultrasonic return signal enables detection of reflected signals only from the set point. A decrease in coherence between transmitted and received signals indicates unsteady flow conditions due to solids deposition.

Another existing non-commercial technique measures the apparent electrical resistivity of the slurry near the pipe invert, with a change in resistivity indicating the formation of a solids bed. This technique was deemed to be not very successful due to poor repeatability and other problems.

Another non-commercial technique utilizes self-heating thermal probes mounted in the slurry. A moving slurry removes temperature from the probes, while a stationary solids bed around the probe causes heat to build up. Thus a temperature rise is indicative of solids deposition. While this technique is promising, it is an invasive technique requiring the thermal probes to be placed in the pipe. Such invasive techniques have drawbacks in that they require the process to be stopped to allow for installation and maintenance of the probes.

Another technique involves the installation of a short pipe with slightly larger inside diameter, where a stationary solids bed is allowed to form and is maintained as a control while the main pipeline is operated with no solids bed. The control solids bed is then monitored by one or more of the techniques described above. An increase in the height of the control bed then indicates the likely formation of a sliding bed in the main pipeline, which is a precursor of a stationary bed and eventual blockage. When the control solids bed height increases beyond a certain limit, the flow rate may be increased to avoid solids deposition.

Thus, there remains a need for a method and apparatus for measuring parameters such as velocity, level of stratification, and volumetric flow rate of a stratified flow.

SUMMARY OF THE INVENTION

The above-described and other needs are met by an apparatus and method of the present invention, wherein a spatial array of sensors is disposed at different axial locations along the pipe. Each of the sensors provides a signal indicative of unsteady pressure created by coherent structures convecting with the flow. A signal processor determines, from the signals, convection velocities of coherent structures having different length scales. The signal processor then compares the convection velocities to determine a level of stratification of the flow. In one embodiment, the signal processor compares the convection velocities by constructing a plot of the convection velocities as a function of the length scales, and determining a slope of a best-fit line through the plot. The slope of the line indicates the level of stratification of the flow.

In one embodiment, the slope is used as part of a calibration procedure to determine the volumetric flow rate of the flow. For example, the calibration may include determining a frequency range over which a convective ridge is analyzed in determining a volumetric flow rate of the flow.

In one embodiment, constructing a plot of convection velocity of the coherent structures as a function of frequency includes: constructing from the signals at least a portion of a k-w plot; identifying a convective ridge in the k-w plot over a first frequency range; determining a first slope of the convective ridge, the first slope being indicative of the nominal velocity of the flow; identifying a plurality of portions of the convective ridge over a plurality of second frequency ranges, each second frequency range being smaller than the first frequency range and having a respective midpoint; determining a second slope for each of the portions of the convective ridge, each second slope being indicative of a nominal convection velocity of coherent structures having a range of length scales corresponding to an associated second frequency range; normalizing the nominal convection velocities of coherent structures using the nominal velocity of the flow to provide normalized convection velocities; and plotting each normalized convection velocity as a function of the respective midpoint non-dimensionalized by the nominal velocity of the flow and the diameter of the pipe to provide the plot. In this embodiment, the first frequency range may be adjusted based on the slope. For example, a non-dimensional length scale that is least sensitive to stratification is used to determine the mid-point of the first frequency range, where the non-dimensional length scale that is least sensitive to stratification is determined by comparing a plurality of dispersion plots for different levels of stratification and identifying the pivot point of the dispersion plots from one dispersion plot to another.

In another aspect of the invention, first and second spatial arrays each have at least two sensors disposed at different axial locations along the pipe. Each of the sensors in the first array provides a first signal indicative of unsteady pressure created by coherent structures convecting with a portion of the flow passing through an upper portion of the pipe, and each of the sensors in the second array provides a second signal indicative of unsteady pressure created by coherent structures convecting with a portion of the flow passing through a lower portion of the pipe. A first velocity of the flow in the upper portion of the pipe is determined using the first signals, and a second velocity of the flow in the lower portion of the pipe is determined using the second signals. The first and second velocities are compared to determine the parameter of the flow. The parameter of the flow may include at least one of: level of stratification of the flow and volumetric flow rate of the flow. The microprocessor may normalize the first and second velocities before comparing the first and second velocities. The first spatial array may be aligned axially along a top of the pipe and the second spatial array may be aligned axially along a bottom of the pipe.

In one embodiment, at least one additional spatial array is aligned axially along the pipe and positioned between the first and second spatial arrays. Each of the sensors in the at least one additional array provides a third signal indicative of unsteady pressure created by coherent structures convecting with a portion of the flow proximate the sensor. For each additional spatial array, the signal processor determines a third velocity of the flow near the additional spatial array using the third signals. The signal processor compares the first, second, and third velocities to determine the parameter of the flow.

In yet another aspect of the invention, an apparatus for measuring a parameter of a flow passing through a pipe comprises a spatial array of sensors disposed at different axial locations along the pipe, where each of the sensors includes a pair of sensor half-portions disposed on opposing lateral surfaces of the pipe. Each pair of sensor half-portions provides a pressure signal indicative of unsteady pressure created by coherent structures convecting with the flow within the pipe at a corresponding axial location of the pipe. A signal processor determines a nominal velocity of the flow within the pipe using the signals.

In one embodiment, each sensor half-portion is formed by a piezoelectric film material. Each sensor half-portion may be coupled to a steel strap that extends around and clamps onto the outer surface of the pipe.

In various aspects and embodiments described herein, the at least two pressure sensors may be selected from a group consisting of: piezoelectric, piezoresistive, strain gauge, strain-based sensor, PVDF, optical sensors, ported ac pressure sensors, accelerometers, velocity sensors, and displacement sensors. In various aspects and embodiments described herein, the sensors may be disposed on an outer surface of the pipe and do not contact the fluid.

The foregoing and other objects, and features of the present invention will become more apparent in light of the following detailed description of exemplary embodiments thereof.

BRIEF DESCRIPTION OF THE DRAWINGS

Referring now to the drawing wherein like items are numbered alike in the various Figures.

DETAILED DESCRIPTION

As described in commonly-owned U.S. Pat. No. 6,609,069 to Gysling, entitled "Method and Apparatus for Determining the Flow Velocity Within a Pipe", and U.S. patent application, Ser. No. 10/007,736, filed on Nov. 11, 2001, now U.S. Pat. No. 6,889,562, which are incorporated herein by reference in their entirety, unsteady pressures along a pipe caused by coherent structures (e.g., turbulent eddies and vortical disturbances) that convect with a fluid flowing in the pipe, contain useful information regarding parameters of the fluid. The present invention provides various means for using this information to measure parameters of a stratified flow, such as, for example, velocity, level/degree of stratification, volumetric flow rate, and speed of sound (i.e., Mach number).

Figure 1:
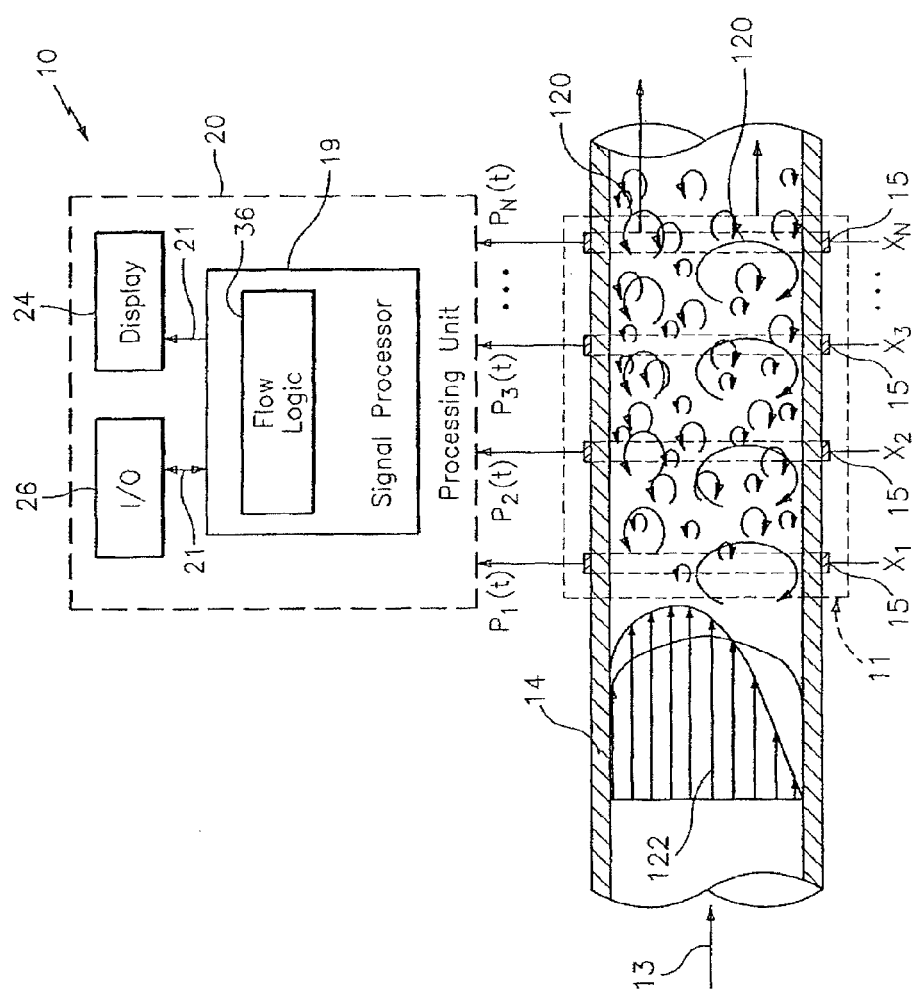
FIG. 1 is schematic diagram of an apparatus for determining at least one parameter associated with a stratified fluid flowing in a pipe.

Referring to FIG. 1, an apparatus 10 for measuring at least one parameter associated with a flow 13 flowing within a duct, conduit or other form of pipe 14, is shown. The parameter of the flow 13 may include, for example, at least one of: velocity of the flow 13, volumetric flow rate of the flow 13, and level of stratification of the flow 13. In FIG. 1, the flow 13 is depicted as being stratified, where a velocity profile 122 of the flow 13 is skewed from the top of the pipe 14 to the bottom of the pipe 14, as may be found in industrial fluid flow processes involving the transportation of a high mass fraction of high density, solid materials through a pipe where the larger particles travel more slowly at the bottom of the pipe. For example, the flow 13 may be part of a hydrotransport process.

Figure 2:
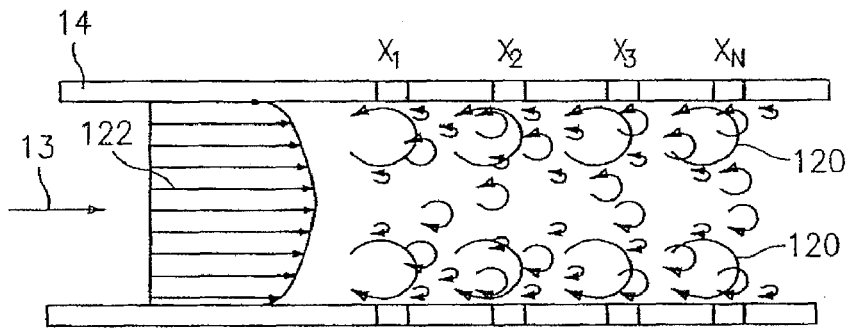
FIG. 2 is a cross-sectional schematic view of non-stratified, turbulent, Newtonian flow through a pipe.

Referring to FIG. 2, the flow 13 is again shown passing through pipe 14. However, in FIG. 2, the flow 13 is depicted as a non-stratified, Newtonian flow operating in the turbulent regime at Reynolds numbers above about 100,000. The flow 13 of FIG. 2, has a velocity profile 122 that is uniformly developed from the top of the pipe 14 to the bottom of the pipe 14. Furthermore, the coherent structures 120 in the non-stratified, turbulent, Newtonian flow 13 of FIG. 2 exhibit very little dispersion. In other words, the speed of convection of the coherent structures 120 is not strongly dependent on the physical size of the structures 120. As used herein, dispersion describes the dependence of convection velocity with wavelength, or equivalently, with temporal frequency. Flows for which all wavelengths convect at a constant velocity are termed "non-dispersive". For turbulent, Newtonian flow, there is typically not a significant amount of dispersion over a wide range of wavelength to diameter ratios.

Sonar-based flow measurement devices, such as, for example, the device described in aforementioned U.S. Pat. No. 6,609,069 to Gysling, have advantageously applied the non-dispersive characteristic of turbulent, Newtonian flow in accurately determining flow rates. For stratified flows such as those depicted in FIG. 1, however, some degree of dispersion is exhibited. In other words, the coherent structures 120 convect at velocities that depend on their size, with larger length scale coherent structures 120 tending to travel slower than smaller length scale structures 120. As a result, some of the underlying assumptions associated with prior sonar-based flow measurement devices, namely that the speed of convection of the coherent structures 120 is not strongly dependent on the physical size of the structures 120, are affected by the presence of stratification.

The apparatus 10 of FIG. 1 accurately measures parameters such as velocity, level of stratification, and volumetric flow rate of a stratified flow 13. The apparatus 10 includes a spatial array 11 of at least two sensors 15 disposed at different axial locations $x_1 \ldots x_N$ along the pipe 14. Each of the sensors 15 provides a pressure signal P(t) indicative of unsteady pressure created by coherent structures convecting with the flow 13 within the pipe 14 at a corresponding axial location $x_1 \ldots x_N$ of the pipe 14. The pressure generated by the convective pressure disturbances (e.g., eddies 120) may be measured through strained-based sensors 15 and/or pressure sensors 15. The sensors 15 provide analog pressure time-varying signals $P_1(t), P_2(t), P_3(t) \ldots P_N(t)$ to a signal processor 19, which determines the parameter of the flow 13 using pressure signals from the sensors 15, and outputs the parameter as a signal 21.

While the apparatus 10 is shown as including four sensors 15, it is contemplated that the array 11 of sensors 15 includes two or more sensors 15, each providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 sensors 15. Generally, the accuracy of the measurement improves as the number of sensors 15 in the array 11 increases. The degree of accuracy provided by the greater number of sensors 15 is offset by the increase in complexity and time for computing the desired output parameter of the flow. Therefore, the number of sensors 15 used is dependent at least on the degree of accuracy desired and the desire update rate of the output parameter provided by the apparatus 10.

The signals $P_1(t) \ldots P_N(t)$ provided by the sensors 15 in the array 11 are processed by the signal processor 19, which may be part of a larger processing unit 20. For example, the signal processor 19 may be a microprocessor and the processing unit 20 may be a personal computer or other general purpose computer. It is contemplated that the signal processor 19 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

The signal processor 19 may output the one or more parameters 21 to a display 24 or another input/output (I/O) device 26. The I/O device 26 may also accept user input parameters. The I/O device 26, display 24, and signal processor 19 unit may be mounted in a common housing, which may be attached to the array II by a flexible cable, wireless connection, or the like. The flexible cable may also be used to provide operating power from the processing unit 20 to the array 11 if necessary.

Figure 3:
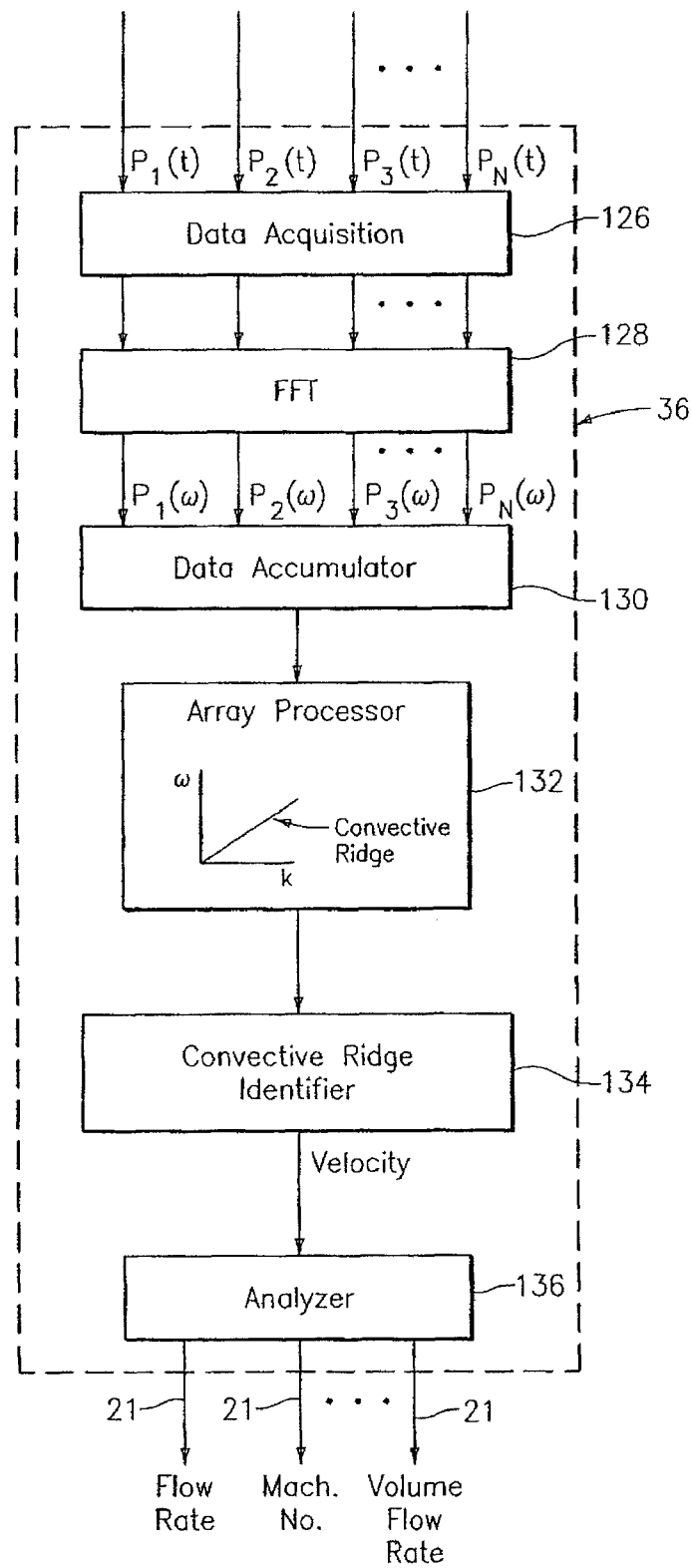
FIG. 3 is a block diagram of a flow logic used in the apparatus of the present invention.

To determine the one or more parameters 21 of the flow 13, the signal processor 19 applies the data from the sensors 15 to flow logic 36 executed by signal processor 19. Referring to FIG. 3, an example of flow logic 36 is shown. Some or all of the functions within the flow logic 36 may be implemented in software (using a microprocessor or computer) and/or firmware, or may be implemented using analog and/or digital hardware, having sufficient memory, interfaces, and capacity to perform the functions described herein.

The flow logic 36 includes a data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

One technique of determining the convection velocity of the coherent structures (e.g., turbulent eddies) 120 within the flow 13 is by characterizing a convective ridge of the resulting unsteady pressures using an array of sensors or other beam forming techniques, similar to that described in U.S. patent application Ser. No. 09/729,994, filed Dec. 4, 2000, now U.S. Pat. No. 6,609,069, which is incorporated herein by reference. A data accumulator 130 accumulates the frequency signals $P_1(\omega)$-$P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi v$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensors 15 apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. As will be described hereinafter, as the flow becomes increasingly dispersive, the convective ridge becomes increasingly non-linear. What is being sensed are not discrete events of coherent structures 120, but rather a continuum of possibly overlapping events forming a temporally stationary, essentially white process over the frequency range of interest. In other words, the convective coherent structures 120 are distributed over a range of length scales and hence temporal frequencies.

To calculate the power in the k-ω plane, as represented by a k-ω plot (see FIG. 4) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 15.

Figure 4:
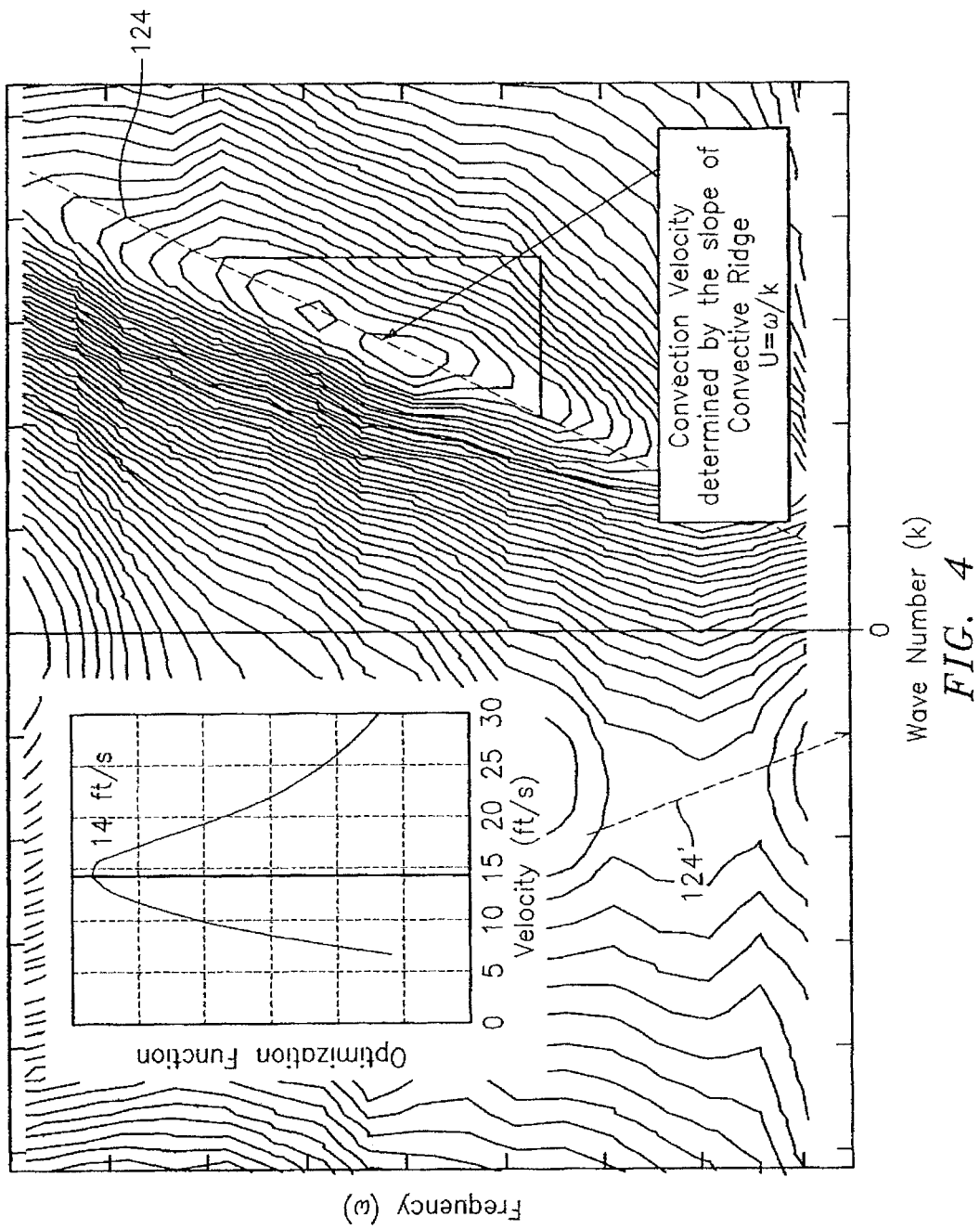
FIG. 4 is a k-ω plot of data processed from an apparatus embodying the present invention that illustrates slope of the convective ridge, and a plot of the optimization function of the convective ridge.

The present embodiment may use temporal and spatial filtering to precondition the signals to effectively filter out the common mode characteristics Pcommon mode and other long wavelength (compared to the sensor spacing) characteristics in the pipe 14 by differencing adjacent sensors 15 and retain a substantial portion of the stochastic parameter associated with the flow field and any other short wavelength (compared to the sensor spacing) low frequency stochastic parameters. In the case of suitable coherent structures 120 being present, the power in the k-ω plane shown in a k-ω plot of FIG. 4 shows a convective ridge 124. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 124 with some slope, the slope indicating the flow velocity.

Once the power in the k-ω plane is determined, a convective ridge identifier 134 uses one or another feature extraction method to determine the location and orientation (slope) of any convective ridge 124 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by $k=\omega/u$, the analyzer 136 determines the flow velocity and/or volumetric flow, which are output as parameters 21. The volumetric flow is determined by multiplying the cross-sectional area of the inside of the pipe with the velocity of the process flow. The analyzer 136 can also determine other parameters 21 such as the speed of sound (i.e., the Mach number) in the process flow using, for example, the method disclosed in U.S. Pat. No. 6,354,147.

As previously noted, for turbulent, Newtonian fluids, there is typically not a significant amount of dispersion over a wide range of wavelength to diameter ratios. As a result, the convective ridge 124 in the k-ω plot is substantially straight over a wide frequency range and, accordingly, there is a wide frequency range for which the straight-line dispersion relation given by $k=\omega/u$ provides accurate flow velocity measurements.

Figure 5:
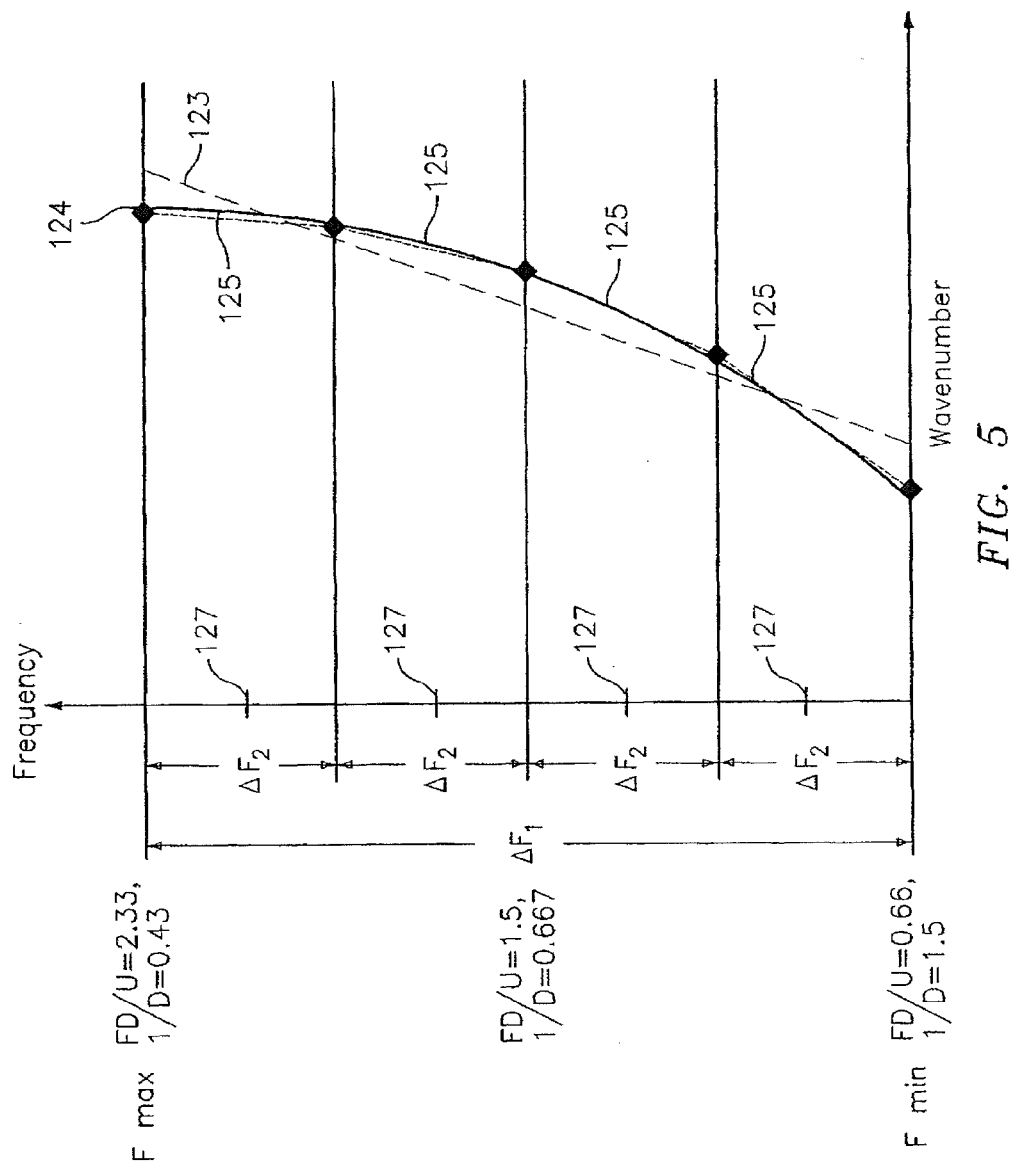
FIG. 5 is a k-ω plot of data processed from an apparatus embodying the present invention that illustrates a non-linear ridge in the k-ω plot, as may be found with dispersive flow.

For stratified flows, however, some degree of dispersion exists such that coherent structures 120 convect at velocities which depend on their size. As a result of increasing levels of dispersion, the convective ridge 124 in the k-ω plot becomes increasingly non-linear. For example, FIG. 5 depicts a k-ω plot having a non-linear ridge 124, which is shown having an exaggerated curvature for purposes of description. Thus, unlike the non-dispersive flows, determining the flow rate of a dispersive mixture by tracking the speed at which coherent structures 120 convect requires a methodology that accounts for the presence of significant dispersion.

Figure 6:
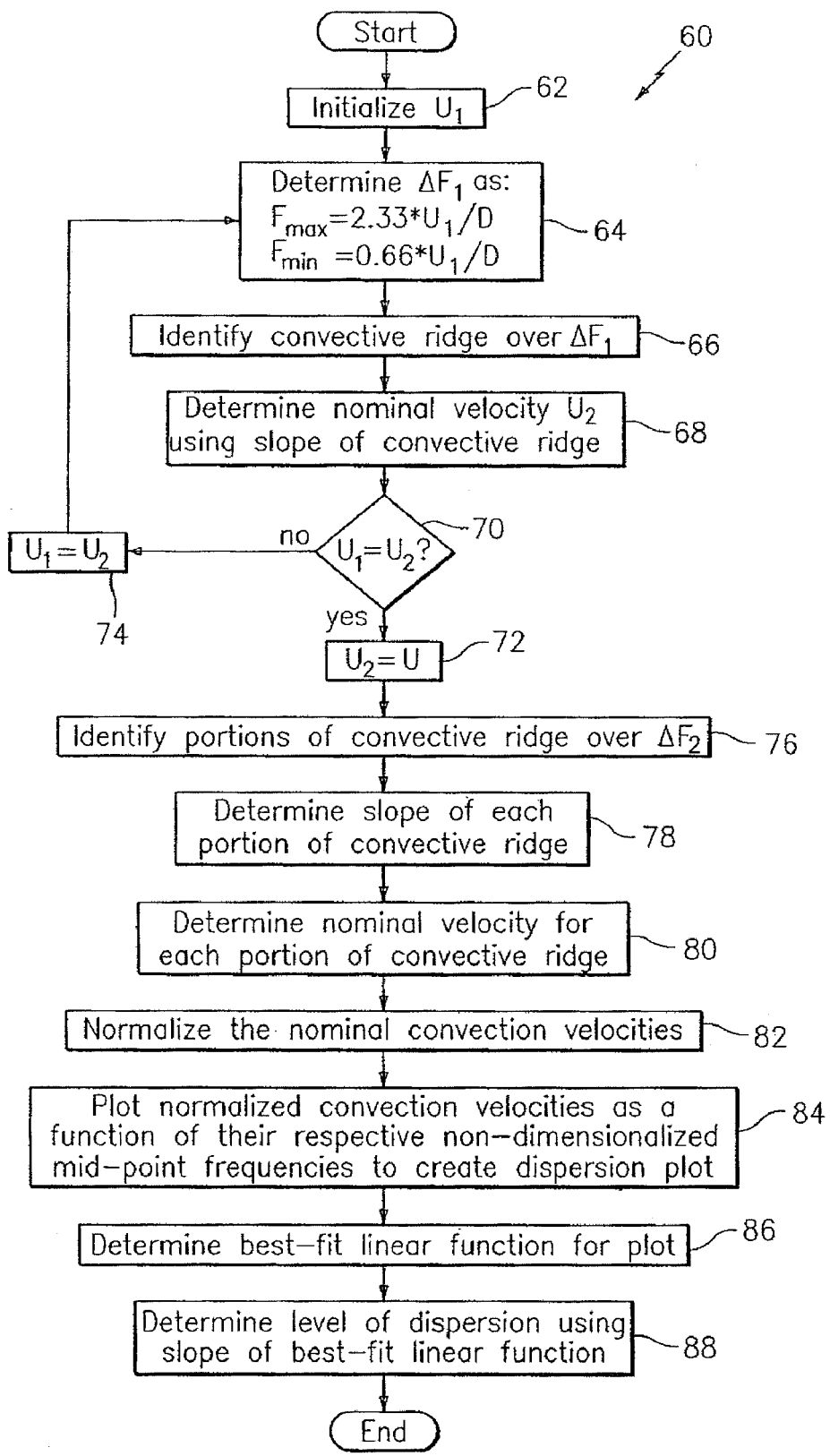
FIG. 6 is a flow chart depicting a method of quantifying the level of stratification.

Referring to FIGS. 3, 5, and 6, a method can be described for quantifying the level of stratification, as well as to measure the volumetric flow rate, in stratified flows. The method, generally indicated in FIG. 6 at 60, begins with block 62, where a velocity $U_1$ of the flow 13 is initialized. Initially, the velocity $U_1$ may be selected, for example, based on operating experience, expected velocities, and the like.

Next, in block 64, maximum and minimum frequencies ($F_{max}$ and $F_{min}$) defining a first frequency range $\Delta F_1$ are determined using the velocity $U_1$, the pipe diameter D, and maximum and minimum non-dimensional length scales FD/U. As will be discussed hereinafter, the maximum and minimum non-dimensional length scales may be determined using a calibration routine wherein the maximum and minimum non-dimensional length scales are selected to define a range centered on a non-dimensional length scale that is least sensitive to stratification. In the example shown in FIG. 5, a maximum non-dimensional length scale of FD/U=2.33 and a minimum non-dimensional length scale of FD/U=0.66 are used. Thus, for this example:

$$F_{max}=2.33*U_1/D$$

$$F_{min}=0.66*U_1/D$$

It will be appreciated, however, that different non-dimensional length scales may be used, depending on the results of the calibration routine.

The method continues at block 66, where the convective ridge identifier 134 identifies a convective ridge 124 in the k-ω plot as a straight line 123 (FIG. 5) over the first frequency range $\Delta F_1$. In block 66, the convective ridge identifier 134 determines the slope of the straight line representation of the first convective ridge (e.g., the slope of line 123), and, using this slope, the analyzer 136 determines a nominal velocity $U_2$ (block 68). Recalling that FD/U is the inverse of λ/D, where λ is wavelength, the non-dimensional length scale of FD/U ranging from 0.66 to 2.33 corresponds to 1/D's (for λ=1) of 1.5 to 0.43. Note that the nominal velocity $U_2$ is centered on coherent structures with length scales of 0.667 diameters in length.

After the nominal velocity $U_2$ is calculated over the frequency range $\Delta F_1$ in block 68, the nominal velocity $U_2$ is compared to the velocity $U_1$ in block 70 and, if the two velocities are equal (or approximately equal within an appropriate range), then the nominal velocity $U_2$ is provided as the nominal velocity U of the flow 13 (block 72), which may be used to determine volumetric flow rate of the flow 13.

If, however, the velocities $U_1$ and $U_2$ are not equal (or not within the appropriate range) in block 70, $U_1$ is set equal to $U_2$ (block 74) and the process returns to block 64 where the maximum and minimum frequencies ($F_{max}$ and $F_{min}$) defining the first frequency range $\Delta F_1$ are determined using the new velocity $U_1$. This iterative process continues until $U_1=U_2$ at block 70.

After the nominal velocity U of the flow 13 is determined (block 72), average convection velocities are then calculated over a plurality of relatively small frequency ranges $\Delta F_2$. In method 60, this is accomplished by identifying a plurality of portions 125 (FIG. 5) of the convective ridge 124 over a plurality of second frequency ranges $\Delta F_2$ (block 76), where each second frequency range $\Delta F_2$ is smaller than the first frequency range $\Delta F_1$ and has a unique midpoint frequency, as shown at 127 in FIG. 5. The convective ridge identifier 134 then determines a slope of each portion 125 of the convective ridge 124 as a best fit line forced to fit through the origin and the portion of the convective ridge (block 78). Using the slope of each portion 125, the analyzer 136 determines a nominal convection velocity of coherent structures having a range of length scales corresponding to the associated second frequency range $\Delta F_2$ (block 80). Next, in block 82, the analyzer 136 normalizes these nominal convection velocities using the nominal velocity U, and then plots each normalized convection velocity as a function of the respective midpoint frequency 127 (non-dimensionalized by the nominal velocity U and the diameter D of the pipe) to create a dispersion plot (block 84).

The functional dependency of the velocity versus frequency is captured by a linear fit (block 86). For non-dispersive flows, the linear fit would have a slope of 0.0 and a y-intercept of 1.0. Any variation to this can be attributed to dispersion. For flows with dispersion, the slope of the linear fit serves as a quantifiable measure of the stratification (block 88).

Figure 7:
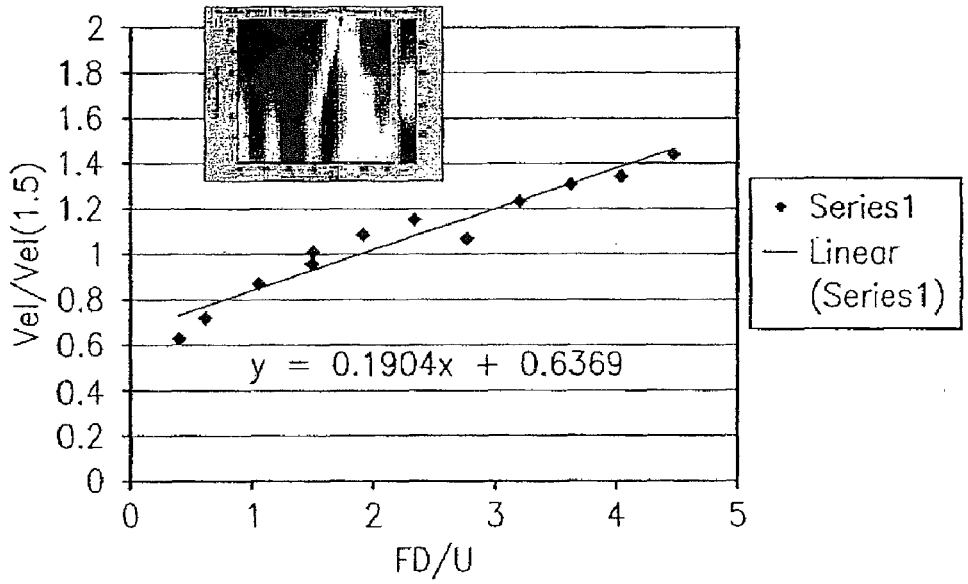
FIG. 7 depicts an example of a dispersion plot for a 30 inch hydrotransport line with a nominal velocity of 12 ft/sec created using the method of the present invention.

FIG. 7 depicts an example of a dispersion plot for a 30 inch hydrotransport line with a nominal velocity U of 12 ft/sec. created using the method of the present invention. For the example given in FIG. 7, the dispersion metric, i.e., the slope of the dispersion plot, is 19%, which indicates a significant amount of dispersion. The convection velocity, determined as described above for wavelengths of one diameter is 0.8 of the velocity of the wavelength with a length of 0.667 diameters (i.e., FD/U=1.5). Structures with wavelengths centered around ¼ diameters (i.e., FD/U=4) are shown to be convecting roughly 1.4 times the convection velocity of wavelengths centered around 0.667 diameters.

The dispersion plot can also be used as part of a calibration procedure to accurately determine the volumetric flow rate in the presence of stratification. For example, the range of non-dimensional length scales of FD/U used in determining the nominal flow velocity U may be selected as that range which is least sensitive to stratification. This may be accomplished, for example, by creating two or more dispersion plots, each at a different level of stratification. For example, in the hydrotransport of solids, dispersion plots may be created for different concentrations of solids. It has been determined that, as the slope of the linear fit of the dispersion plot increases from one level of stratification to another, the point about which the linear fit pivots provides a good approximation of the non-dimensional length scale FD/U that is least sensitive to stratification. Thus, the non-dimensional length scale FD/U that is least sensitive to stratification can be approximated by comparing the dispersion plots for different levels of stratification and identifying the pivot point of the linear fit of the dispersion plot from one dispersion plot to another. The non-dimensional length scale FD/U associated with the pivot point can be used as the mid-point for the range of non-dimensional length scales of FD/U used in method 60 of FIG. 6 for determining the nominal flow velocity U and the dispersion plot.

Figure 8:
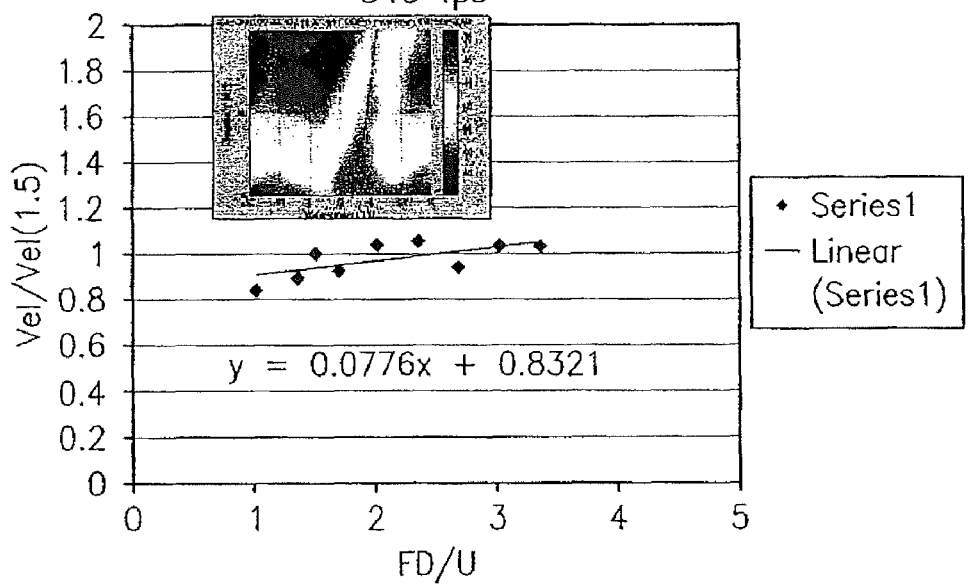
FIG. 8 depicts an example of a dispersion plot for a 27 inch hydrotransport line with a nominal velocity of 15 ft/sec created using the method of the present invention.

FIGS. 7-12 depict various examples of dispersion plots created using the method of the present invention. In each of these examples, a spatial wave number (i.e., FD/U) range of 0.66 to 2.33 with a center wave number of 1.5 was used. FIG. 8 shows an example of a hydrotransport of bitumen, sand, water, and air. In this case, the flow is in a 27 inch pipe, traveling at a nominal flow rate of 15 ft/sec. Here the slope of the dispersion plot is calculated to be 0.078 (i.e., a dispersion parameter of 7.8%).

Figure 9:
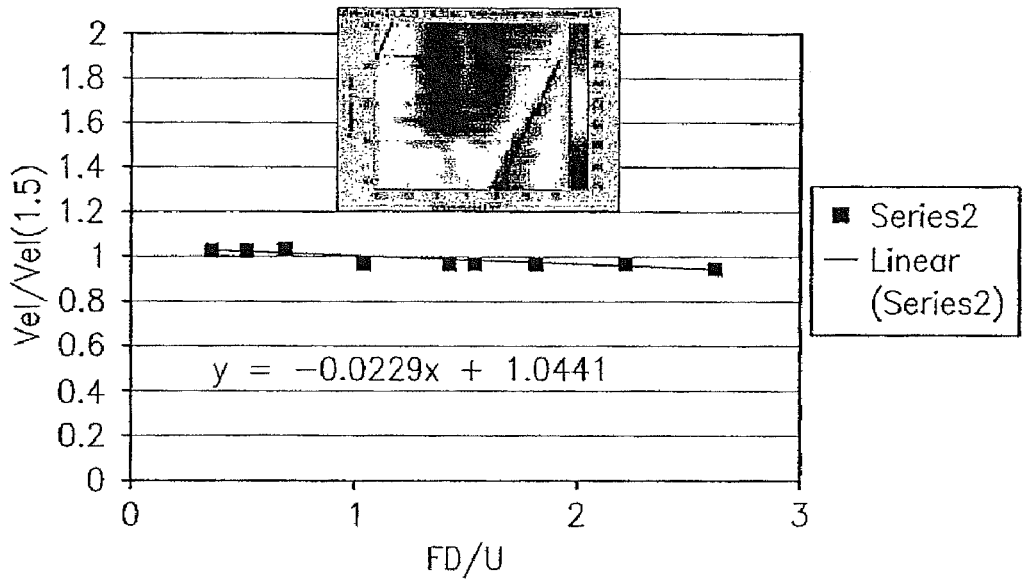
FIG. 9 depicts an example of a dispersion plot for a 10 inch, 1% consistency pulp-in-water suspension flowing at a nominal volumetric flow rate of 10 ft/sec created using the method of the present invention.

FIG. 9 shows a dispersion plot for a 10 inch, 1% consistency pulp-in-water suspension flowing at a nominal volumetric flow rate of 10 ft/sec. The resulting linear curve fit equation, shown in FIG. 9, has a slope of −0.023, which can be classified as non-dispersive flow.

Figure 10:
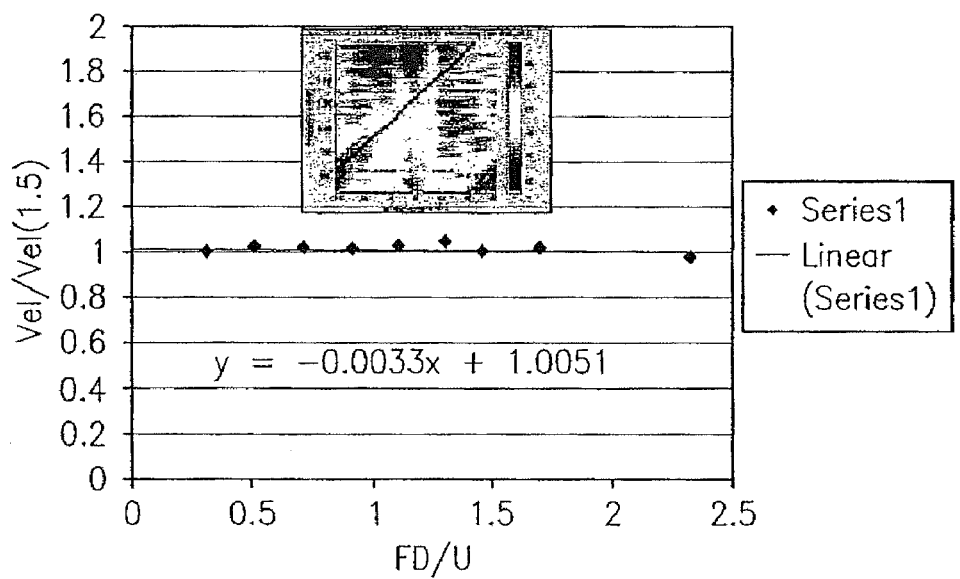
FIG. 10 depicts an example of a dispersion plot for a mixture of bitumen, sand, water, and air at 25 ft/see in a 4 inch diameter pipe created using the method of the present invention.

FIG. 10 shows a dispersion plot for a mixture of bitumen, sand, water, and air at 25 ft/sec in a 4 inch diameter pipe. The resulting linear curve fit equation, shown in FIG. 10, has a slope of −0.003, which can be classified as non-dispersive flow.

Figure 11:
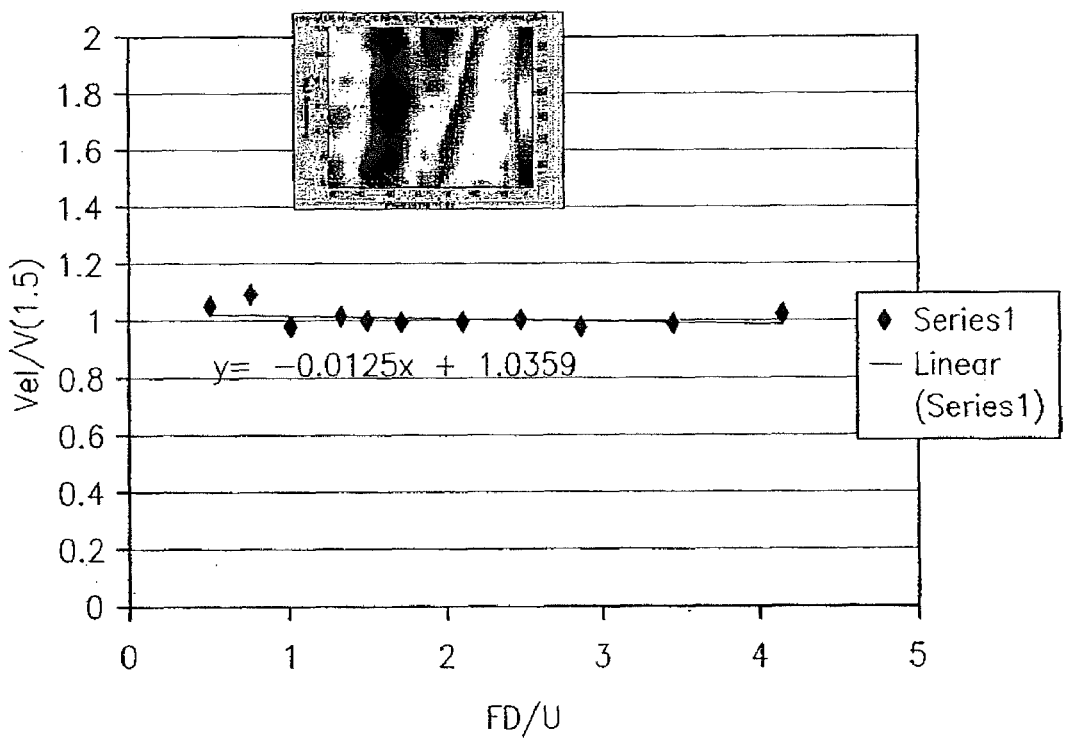
FIG. 11 depicts an example of a dispersion plot for a 16 inch pipe flowing water at a nominal flow velocity of 10 ft/sec created using the method of the present invention.

FIG. 11 shows a dispersion plot for a 16 inch pipe flowing water at a nominal flow velocity of 10 ft/sec. The resulting linear curve fit equation, shown in FIG. 11, has a slope of −0.013, which can be classified as non-dispersive flow.

Figure 12:
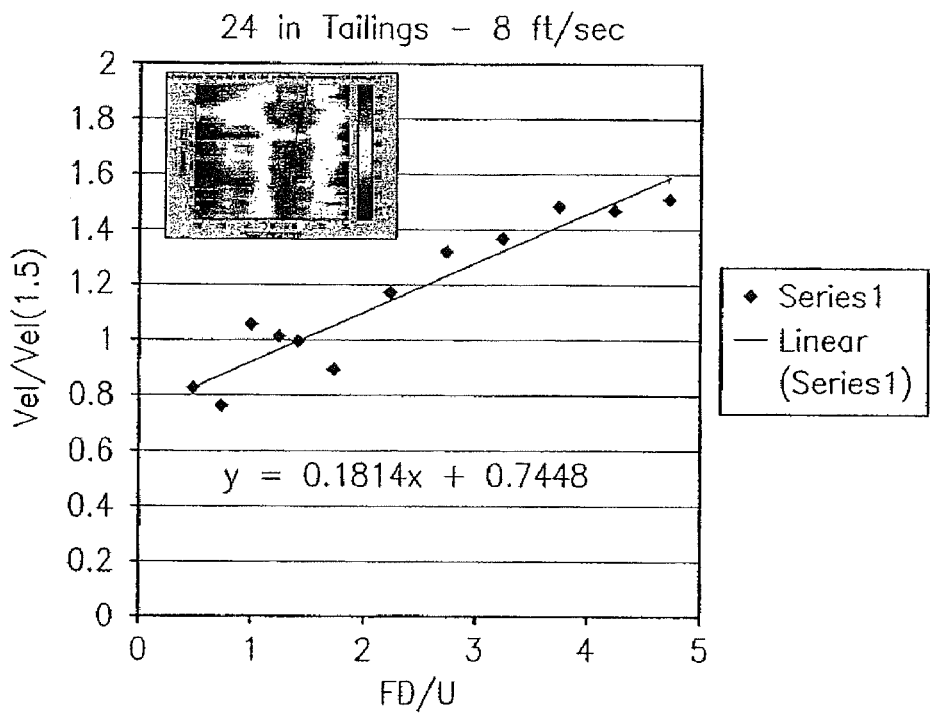
FIG. 12 depicts an example of a dispersion plot for a 24 inch tailings line operating at 8 ft/sec created using the method of the present invention.
Figure 13:
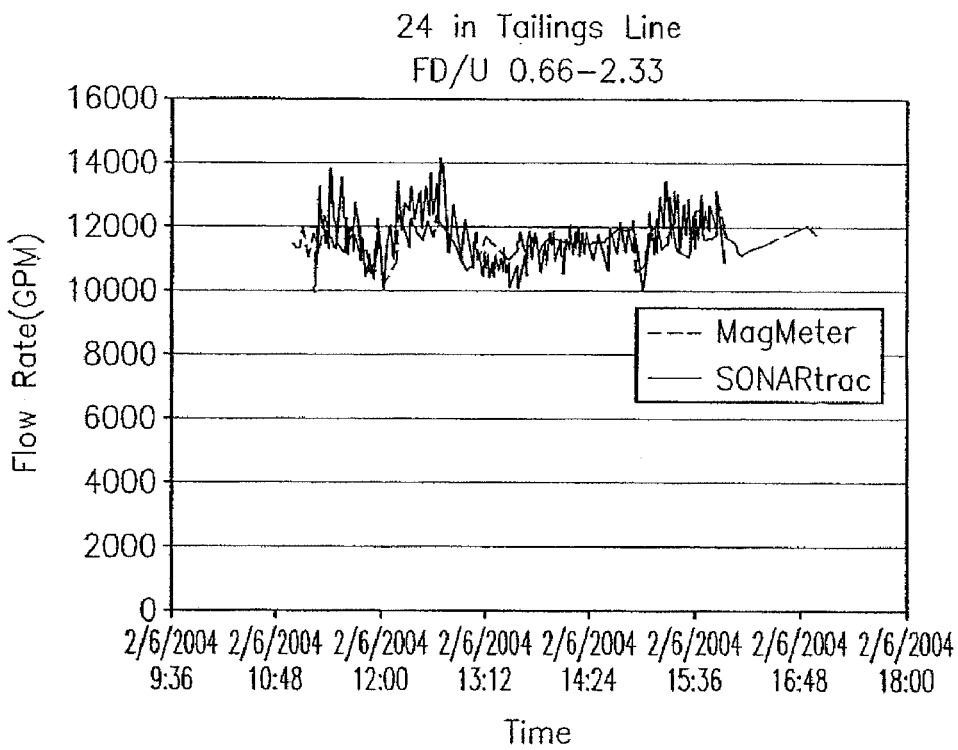
FIG. 13 is a plot depicting a flow rate determined by the method of the present invention demonstrated compared with a flow rate determined by an in-line magnetic flow meter.

FIG. 12 shows the dispersion characteristics for a 24 inch tailings line operating at 8 ft/sec. As shown, the tailings line is exhibiting a dispersion metric of about 18%. Using a spatial wave number (i.e. FD/U) range of 0.66 to 2.33 with a center wave number of 1.5, the velocity determined by the method of the present invention demonstrated good agreement with an in-line magnetic flow meter, as demonstrated in FIG. 13. Centering the frequency range on structure with a length scale of ⅔ the pipe diameter seems reasonable and consistent with conceptual model. Although accurate reference data from other stratified flows is currently not available, the similar dispersion characteristics suggest that using this, or similar, non-dimensional length scales should be a reasonable approach for interpreting the volumetric flow rates other stratified flows using sonar-based flow measurement.

Comparison of the examples provided in FIGS. 7-12 reveals that the slope of the dispersion curve tracks, at least qualitatively, the level of stratification present. The slope approaches zero for well-mixed slurries and Newtonian fluids and increases with decreasing flow rates, consistent with stratification increasing with decreasing flow rates.

Figure 14:
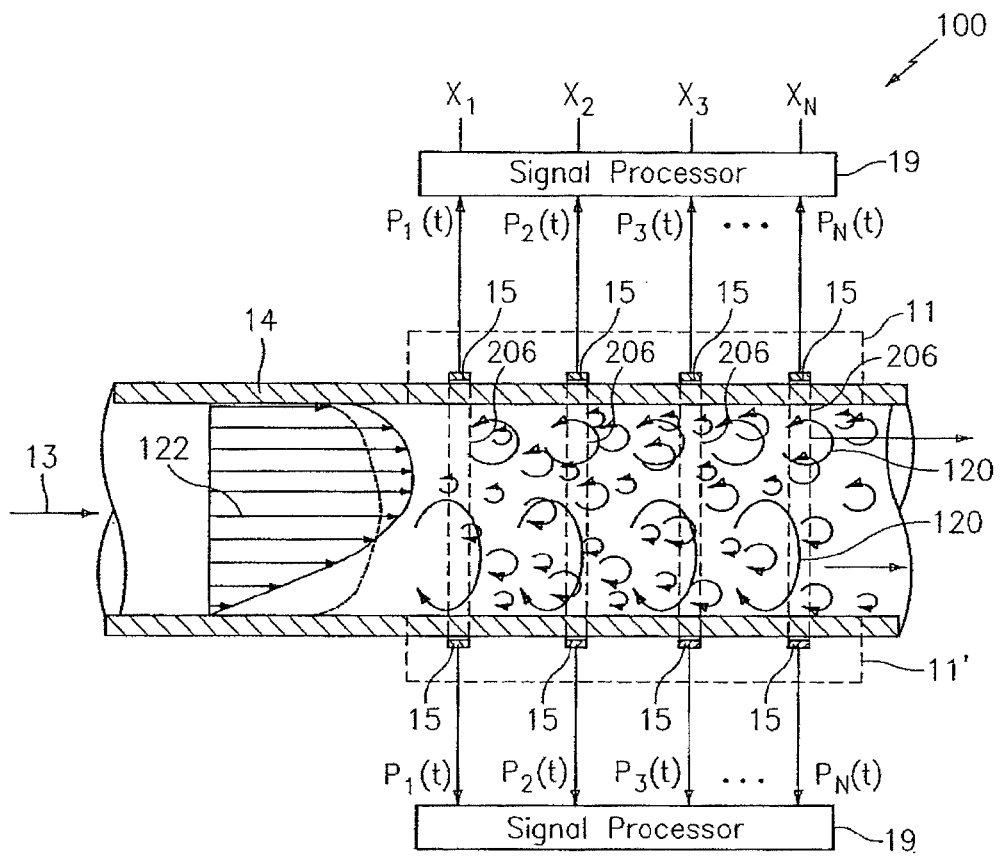
FIG. 14 depicts a longitudinal cross-section of an alternative embodiment of the present invention.
Figure 15:
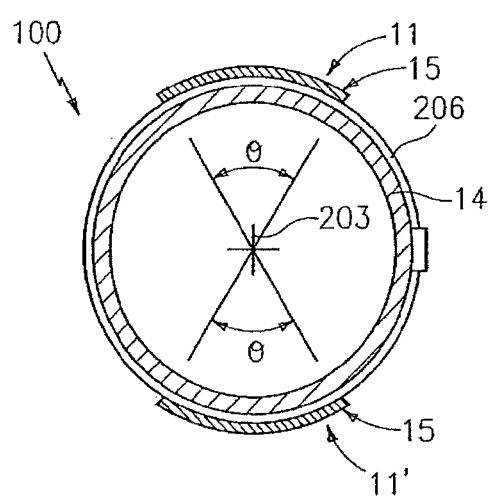
FIG. 15 depicts a transverse (radial) cross-section of the embodiment of FIG. 14.

FIG. 14 depicts a longitudinal cross-section of an apparatus 100 for determining the level of stratification of the flow 13 in accordance with an alternative embodiment of the present invention, and FIG. 15 depicts a transverse (radial) cross-section of the apparatus 100. In this embodiment, the apparatus 100 determines the level of stratification of the flow 13 and a volumetric flow rate of the flow 13 by comparing locally measured velocities at the top and bottom of the pipe 14. The apparatus 100 includes a first spatial array 11 of at least two sensors 15 disposed at different axial locations $x_1 \ldots x_N$ along the top of the pipe 14. Each of the sensors 15 provides a pressure signal (e.g., $P_1(t), P_2(t), P3(t) \ldots P_N(t)$) indicative of unsteady pressure created by coherent structures 120 convecting with a portion of the flow 13 near the top of the pipe 14. The apparatus further includes a second spatial array 11' of at least two sensors 15 disposed at the different axial locations $x_1 \ldots x_N$ along the bottom of the pipe 14. Each of the sensors 15 in the second spatial array 11' provides a pressure signal (e.g., $P'_1(t), P'_2(t), P'3(t) \ldots P'_N(t)$) indicative of unsteady pressure created by coherent structures 120 convecting with a portion of the flow 13 near the bottom of the pipe 14.

The sensors 15 from each array 11 and 11' provide analog pressure time-varying signals $P_1(t), P_2(t), P_3(t) \ldots P_N(t)$ to one or more signal processors 19 to determine flow velocity of each array. The signal processor 19 applies the pressure signals from the sensors 15 in the array 11 to flow logic 36 executed by the signal processor 19 to determine the velocity of the flow 13 near the top of the pipe 14. The signal processor 19 applies the pressure signals from the sensors 15 in the array 11' to flow logic 36 executed by the signal processor 19 to determine the velocity of the flow 13 near the bottom of the pipe 14. The flow logic 36 applies a sonar array-processing algorithm as described above with respect to FIGS. 3 and 4 to determine the velocities.

In the embodiment shown, each of the sensors 15 is formed by a strip of piezoelectric material such as, for example, the polymer, polarized fluoropolymer, PVDF, which measures the strain induced within the pipe 14 due to the coherent structures convecting with the flow 13. The sensors 15 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The strips of piezoelectric film material forming the sensors 15 along each axial location $x_1 \ldots x_N$ of the pipe 14 may be adhered to the surface of a steel strap 206 (e.g., a hose clamp) that extends around and clamps onto the outer surface of the pipe 14. As discussed hereinafter, other types of sensors 15 and other methods of attaching the sensors 15 to the pipe 14 may be used.

In the embodiment shown, the sensors 15 extend over an arcuate outer surface of the pipe 14 defined by the angle θ, which is centered on a vertical line 203. For example, the each of the sensors 15 may extend about ¼ of the circumference of the pipe 14. Because the sensors 15 do not extend across the side surfaces of the pipe 14, and because the sensors 15 tend to sense local disturbances within the flow 13, the sensors 15 sense coherent structures 120 convecting with a portion of the flow 13 near the top or bottom of the pipe 14. Accordingly, as the size of the sensors 15 are decreased (i.e., as the angle θ is decreased), the unsteady pressures sensed by the by the sensors 15 more accurately indicate the nominal flow velocity of the portion of the flow 13 near the top or bottom of the pipe 14. However, the degree of accuracy provided by decreasing the size of the sensors is offset by the decrease in signal strength provided by the sensors 15. Therefore, the size of the sensors 15 (i.e., the angle θ used) is dependent at least on the degree of accuracy desired and the strength of the signals $P_1(t), P_2(t), P_3(t) \ldots P_N(t)$ required by the signal processor 19.

While the apparatus 100 is shown as including four sensors 15 in each array 11 and 11', it is contemplated that each array 11 and 11' may include two or more sensors 15, with each sensor 15 providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 sensors 15. Generally, the accuracy of the measurement improves as the number of sensors 15 in the arrays 11 and 11' increases. The degree of accuracy provided by the greater number of sensors 15 is offset by the increase in complexity and time for computing the desired output parameter of the flow. Therefore, the number of sensors 15 used is dependent at least on the degree of accuracy desired and the desire update rate of the output parameter provided by the apparatus 100.

Figure 16:
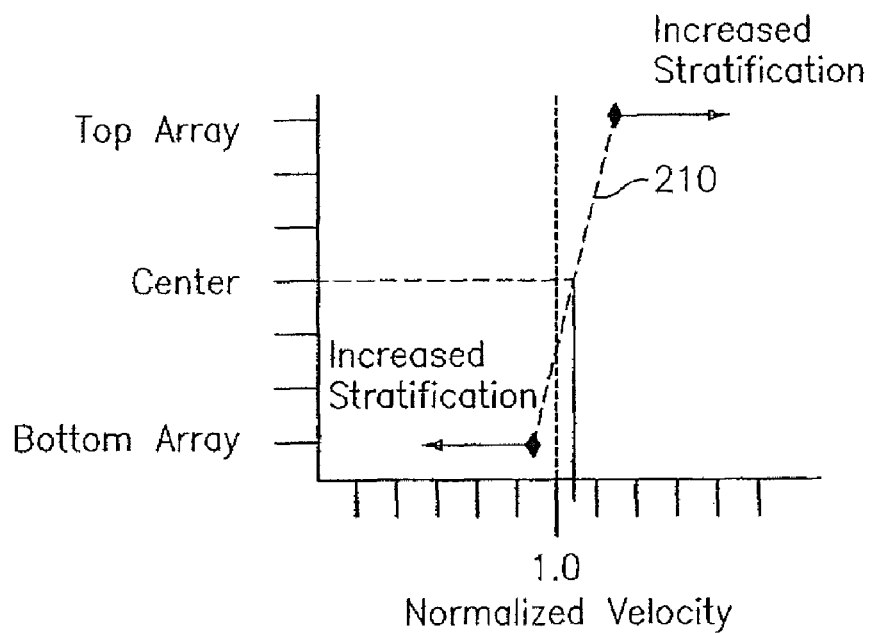
FIG. 16 depicts a plot of the normalized velocity for the top and bottom arrays in the embodiment of FIG. 14.

FIG. 16 depicts a plot of the normalized velocity for the top and bottom arrays 11 and 11'. The ratio of the velocities near the top and bottom of the pipe 14 correlates to the level of stratification of the flow 13. Under conditions where there is no stratification, flow near the top and bottom of the pipe (and the coherent structures convecting with the flow) will travel at approximately the same velocity. As the level of stratification increases, the top array 11 will measure a higher normalized velocity and the bottom array 11' will measure a lower normalized velocity. Thus, by comparing the velocities near the top and bottom of the pipe 14, the level of stratification of the flow 13 can be determined.

The velocities near the top and bottom of the pipe 14 can also be used to estimate the nominal velocity of the flow 13, which, in turn, may be used to determine the volumetric flow rate of the flow 13. For example, nominal velocity may be determined using an average of the two velocities or some other ratio of the two velocities, wherein the ratio is dependent on the level of stratification (or difference between the two velocities). In another example, as shown in FIG. 16, the velocities near the top and bottom of the pipe may be plot as a function of the distance between the top and bottom arrays. In this example, the distance between the top and bottom arrays is approximately equal to the pipe diameter, and each increment on the x-axis represents some portion of this distance. The velocities at the top and bottom of the pipe define a straight line 210, which has a slope that changes with the level of stratification. Using this straight line, the velocities at different distances between the top and bottom of the pipe can be estimated, and the velocity at the appropriate pipe location can be used as the nominal velocity. In the example shown, velocity at the center of the pipe (mid-way between the top and bottom arrays) is estimated.

Figure 17:
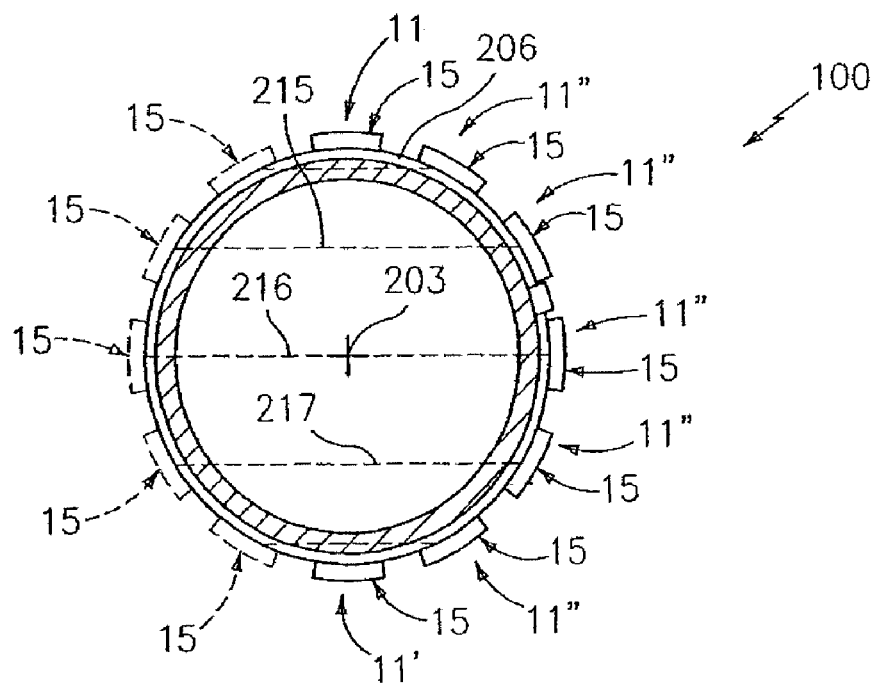
FIG. 17 depicts a transverse (radial) cross-section of the embodiment of FIG. 14 including additional arrays of sensors.
Figure 18:
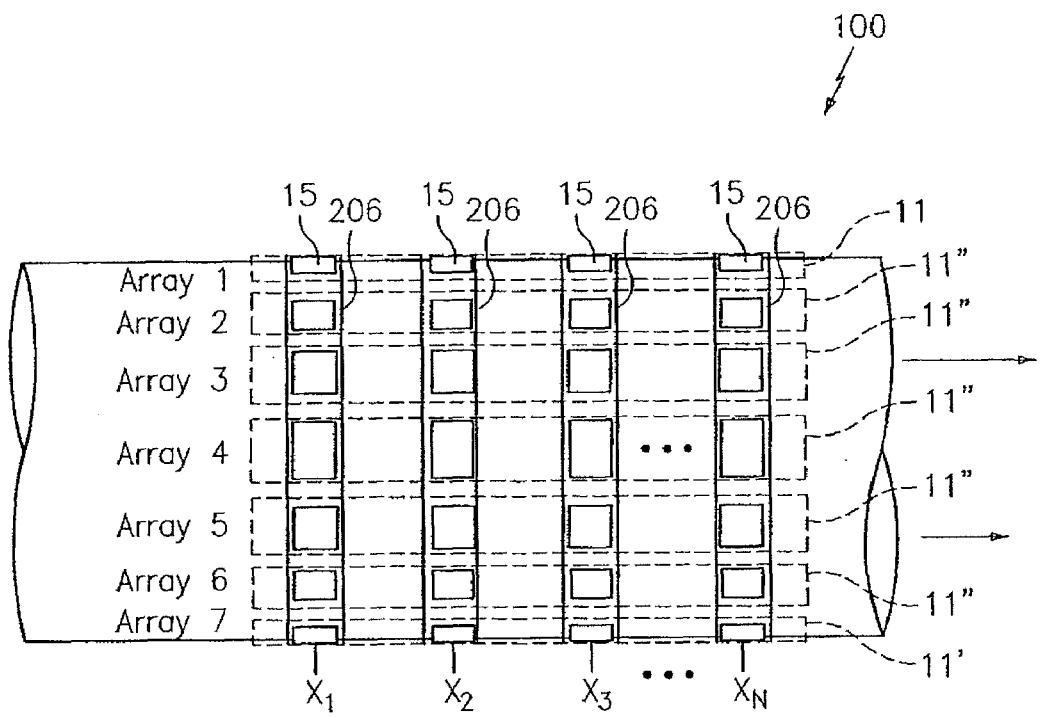
FIG. 18 depicts a side elevation view of the embodiment of FIG. 14 including additional arrays of sensors.

FIG. 17 depicts a transverse (radial) cross-section of the apparatus 100 of FIG. 15, further including at least one additional spatial array 11" of sensors 15 aligned axially along the pipe 14 and being positioned between the first and second spatial arrays 11 and 11'. FIG. 18 depicts a side elevation view of this embodiment. The sensors 15 in each additional array 11" provide analog pressure time-varying signals $P_1(t), P_2(t), P_3(t) \ldots P_N(t)$ to one or more signal processors 19, which determines flow velocity of the fluid proximate each additional array 11". Optionally, each array 11" may comprise a pair of sensors 15 disposed on the pipe at a corresponding level between the top and bottom arrays 11 and 11', as indicated at 215, 216, and 217. These optional sensors 15 are shown in phantom in FIG. 17. For each array, the signals output from the pair of sensors 15 at corresponding axial locations $x_1 \ldots x_N$ are combined (e.g., summed) as a single input to the signal processor 19 to eliminate portions of the signal caused by horizontal bending modes of the pipe 14.

Figure 19:
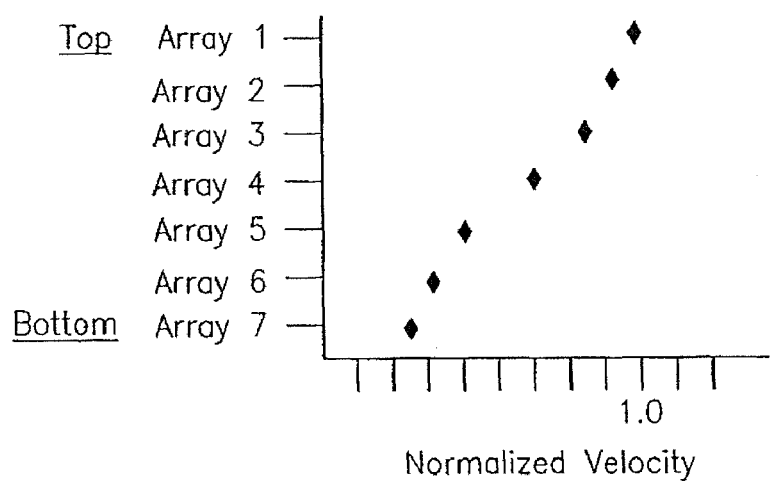
FIG. 19 depicts a plot of normalized velocity sensed by each array of FIGS. 17 and 18.

FIG. 19 depicts a plot of the normalized velocity for each array 11, 11', and 11". As in the example of FIG. 16, the ratio of the velocities near the top and bottom of the pipe 14 correlates to the level of stratification of the flow 13. The additional arrays 11" allow a velocity profile to be constructed, with the number of data points in the profile being equal to the number of arrays 11, 11' and 11". Comparing the velocity profiles of FIG. 16 and FIG. 19, it can be seen that the additional arrays 11" used to create the profile of FIG. 19 allow for a more accurate representation of the velocities at different locations in the pipe 14 than the straight line approximation of FIG. 16.

As can be seen in the velocity profile of FIG. 19, the extreme top and bottom velocity readings (the velocity readings at arrays 1 and 7, respectively) tend to be the most diverse, with the reading at the transverse sides of the pipe 14 (the reading at array 4) providing a nominal velocity for the entire profile. Accordingly, it can be seen that for measuring nominal velocity in stratified flow using an array of sensors, it may be advantageous to sense unsteady pressures along the transverse sides of the pipe, such that the areas of extreme diversity in velocity (i.e., the top and bottom of the pipe) are ignored. For example, the center-most array (array 4) may be used to determine the nominal velocity of the flow 13, or the center-most arrays (e.g., arrays 3, 4, and 5) can be used to determine the nominal velocity of the flow. The present invention also contemplates that any array offset from the center horizontal array (i.e., array 4), such as arrays 3 and 5 or combinations of other arrays (e.g., arrays 2 & 3 or arrays 5 & 6) may be used to determine the nominal or average velocity of the process flow 13. The determination of which array or set of arrays to determine the nominal velocity is dependent on the level of stratification.

Figure 20:
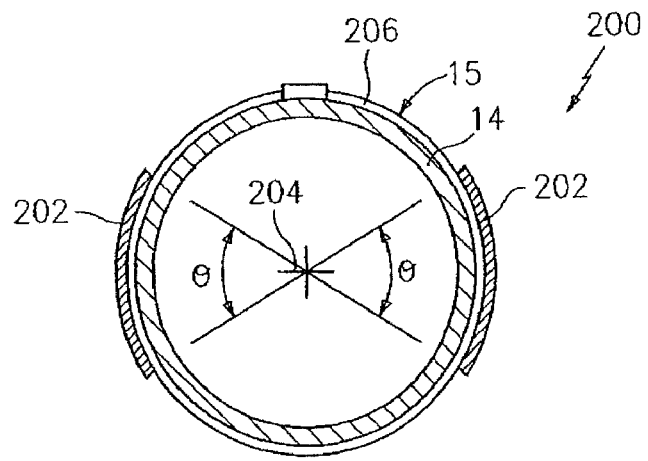
FIG. 20 depicts a transverse (radial) cross-section of another alternative embodiment of the present invention.
Figure 21:
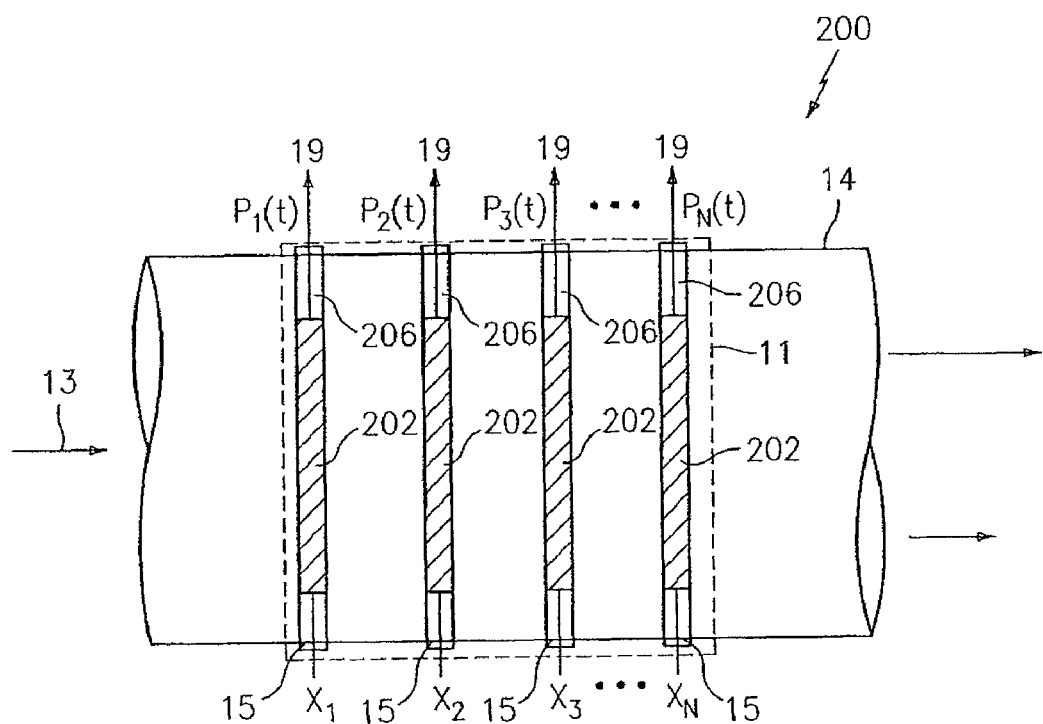
FIG. 21 depicts a side elevation view of the alternative embodiment of FIG. 20.

FIG. 20 depicts a transverse (radial) cross-section of an apparatus 200 for determining the level of stratification of the flow 13 in accordance with another alternative embodiment of the present invention, and FIG. 21 depicts a side elevation view of the alternative embodiment of FIG. 20. In this embodiment, the apparatus 10 includes a spatial array 11 of at least two sensors 15 disposed at different axial locations $x_1 \ldots x_N$ along the pipe 14. Each of the sensors 15 includes a pair of sensor half-portions 202 disposed on opposing lateral surfaces of the pipe 14. Each pair of sensor half-portions 202 provides a pressure signal P(t) indicative of unsteady pressure created by coherent structures 120 (FIG. 1) convecting with the flow 13 within the pipe 14 at a corresponding axial location $x_1 \ldots x_N$ of the pipe 14. The sensors 15 provide analog pressure time-varying signals $P_1(t), P_2(t), P_3(t) \ldots P_N(t)$ to a signal processor 19, which determines the parameter of the flow 13 using pressure signals from the sensors 15, and outputs the parameter as a signal 21. The signals provided by corresponding sensor half-pairs 202 in each sensor 15 may be combined (e.g., summed) as a single input to the signal processor 19, thus eliminating portions of the signal caused by horizontal bending modes of the pipe 14.

In the present embodiment, the sensor half-portions 202 are advantageously placed on the lateral side surfaces of the pipe 14. The sensor half-portions 202 extend over an arcuate outer surface of the pipe 14 defined by the angle θ, which is centered on a horizontal line 204. For example, the each of the sensors 15 may extend about ¼ of the circumference of the pipe 14. Because the sensor half-portions 202 do not extend across the top and bottom surfaces of the pipe 14, and because the sensor half-portions 202 tend to sense local disturbances within the flow 13, the extreme regions of the velocity profile are ignored. Accordingly, as the length of the sensor half-portions 202 is decreased (i.e., as the angle θ is decreased), the unsteady pressures sensed by the sensor half-portions 202 provide a more localized velocity measurement and in some instances a more accurate indication of the nominal flow velocity for stratified flow. However, the degree of accuracy provided by decreasing the size of the sensor half-portions 202 is offset by the decrease in signal strength provided by the sensor half portions 202. Therefore, the size of the sensor half-portions 202 (i.e., the angle θ used) is dependent at least on the degree of accuracy desired and the strength of the signals $P_1(t), P_2(t), P_3(t) \ldots P_N(t)$ required by the signal processor 19.

While the sensor portions 202 are centered about the horizontal plane of the pipe, it may be advantageous to dispose the sensor portions 202 above or below the horizontal center of the pipe depending on the expected level of stratification.

While the apparatus 10 is shown as including four sensors 15, it is contemplated that the array 11 of sensors 15 includes two or more sensors 15, each providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 sensors 15. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desired update rate of the output parameter provided by the apparatus 10.

The signals $P_1(t) \ldots P_N(t)$ provided by the sensors 15 in the array 111 are processed by the signal processor 19, which may be part of a larger processing unit 20. For example, the signal processor 19 may be a microprocessor and the processing unit 20 may be a personal computer or other general purpose computer. It is contemplated that the signal processor 19 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

To determine the one or more parameters 21 of the flow 13, the signal processor 19 applies the data from the sensors 15 to flow logic 36 executed by signal processor 19. The flow logic 36 applies a sonar array-processing algorithm as described above with respect to FIGS. 3 and 4 to determine the velocities. Some or all of the functions within the flow logic 36 may be implemented in software (using a microprocessor or computer) and/or firmware, or may be implemented using analog and/or digital hardware, having sufficient memory, interfaces, and capacity to perform the functions described herein.

In the embodiment shown, each of the sensor half-portions 202 is formed by a piezoelectric material such as, for example, the polymer, polarized fluoropolymer, PVDF, which measures the strain induced within the pipe 14 due to the coherent structures convecting with the flow 13. The sensor half-portions 202 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The PVDF material forming each sensor half-portion 202 may be adhered to the surface of a steel strap 206 (e.g., a hose clamp) that extends around and clamps onto the outer surface of the pipe 14. It is also contemplated that other methods of attaching the sensor half-portions 202 to the pipe 14 may be used. For example, the sensor half-portions 202 may be adhered directly to the pipe 14. As discussed hereinafter, other types of sensors 15 and other methods of attaching the sensors 15 to the pipe 14 may be used.

As previously noted, as the size of the sensor half-portions 202 is decreased (i.e., as the angle θ is decreased), the unsteady pressures sensed by the by the sensor half-portions 202 more accurately indicate the nominal flow velocity for stratified flow. However, the degree of accuracy provided by decreasing the size of the sensor half-portions 202 is offset by the decrease in signal strength provided by the sensor half portions 202. Moreover, as the flow 13 becomes less stratified, it is advantageous to increase the size of sensors 15 in order to sense a larger portion of the flow 13. Combining the teachings of FIGS. 14-21, yet another embodiment of the present invention can be described wherein the size of the sensor half-portions 202 is increased or decreased depending on the level of stratification of the flow 13. This embodiment employs a sensor arrangement similar to that shown in FIGS. 17 and 18, wherein a plurality of sensors 15 are disposed around the perimeter of the pipe 14 at each axial location $x_1 \ldots x_N$ of the pipe 14 (including the optional sensors 15 shown in FIG. 17). For example, the sensors 15 along each axial location $x_1 \ldots x_N$ of the pipe 14 may comprise strips of piezoelectric film material adhered to the surface of a steel strap 206 (e.g., a hose clamp) that extends around and clamps onto the outer surface of the pipe 14. As discussed hereinafter, other types of sensors 15 and other methods of attaching the sensors 15 to the pipe 14 may be used.

In this embodiment, the sensors 15 arrays 11 and 11' are used as previously described with reference to FIGS. 14-19. That is, the signal processor 19 applies the pressure signals from the sensors 15 in the array 11 to flow logic 36 executed by the signal processor 19 to determine the velocity of the flow 13 near the top of the pipe 14, and the signal processor 19 applies the pressure signals from the sensors 15 in the array 11' to flow logic 36 executed by the signal processor 19 to determine the velocity of the flow 13 near the bottom of the pipe 14. The signal processor 19 then compares the velocities near the top and bottom of the pipe 14 to determine the level of stratification of the flow 13.

Also in this embodiment, as shown in FIGS. 17 and 18, for each axial location $x_1 \ldots x_N$ of the pipe 14 (e.g., for each strap 206), the sensors 15 positioned on one side of the pipe (e.g., the sensors 15 to the left of vertical line 203) represent one sensor half-portion, and the sensors 15 positioned on the opposite side of the pipe (e.g. the sensors 15 to the right of vertical line 203) represent the other sensor half portion. For each axial location $x_1 \ldots x_N$, the output signals from each of the sensors 15 forming the sensor half portions are combined (e.g., summed) and processed to determine the nominal velocity of the flow 13 as described with reference to FIGS. 20 and 21.

In response to the determined level of stratification, the signal processor 19 can adjust the size of the sensor half-portions by selecting the number of sensors 15 in each sensor half portion. For example, if the level of stratification is high (e.g., there is a large spread between the velocities at the top and bottom of the pipe 14; i.e. between the upper radial region and the lower radial region with the pipe), the signal processor 19 may process only the signals from one pair of sensors 15 (e.g., the center-most sensors 15 located at line 216 of FIG. 17) for each axial location $x_1 \ldots x_N$ to determine the nominal velocity of the flow 13. If the level of stratification decreases (e.g., there is a reduction in the spread between the velocities at the top and bottom of the pipe 14), the signal processor 19 may combine the signals from an increased number of sensors 15 at each axial location $x_1 \ldots x_N$ (e.g., the sensors 15 located at lines 215, 216, and 217 of FIG. 17) to determine the nominal velocity of the flow 13. Furthermore, if there is no stratification detected, the signal processor may combine the signals from all of the sensors 15 at each axial location $x_1 \ldots x_N$ to determine the nominal velocity of the flow 13.

As discussed hereinbefore referring to FIGS. 17-19, the present invention also contemplates that any array offset from the center horizontal array (i.e., array 4), such as arrays 3 and 5 or combinations of other arrays (e.g., arrays 2 & 3 or arrays 5 & 6) may be used to determine the nominal or average velocity of the process flow 13. The determination of which array or set of arrays to determine the nominal velocity is dependent on the level of stratification. It is further contemplated that the selected arrays to determine the nominal velocity and volumetric flow of the process fluid may be dynamic selected in response to the measured level of stratification.

Figure 22:
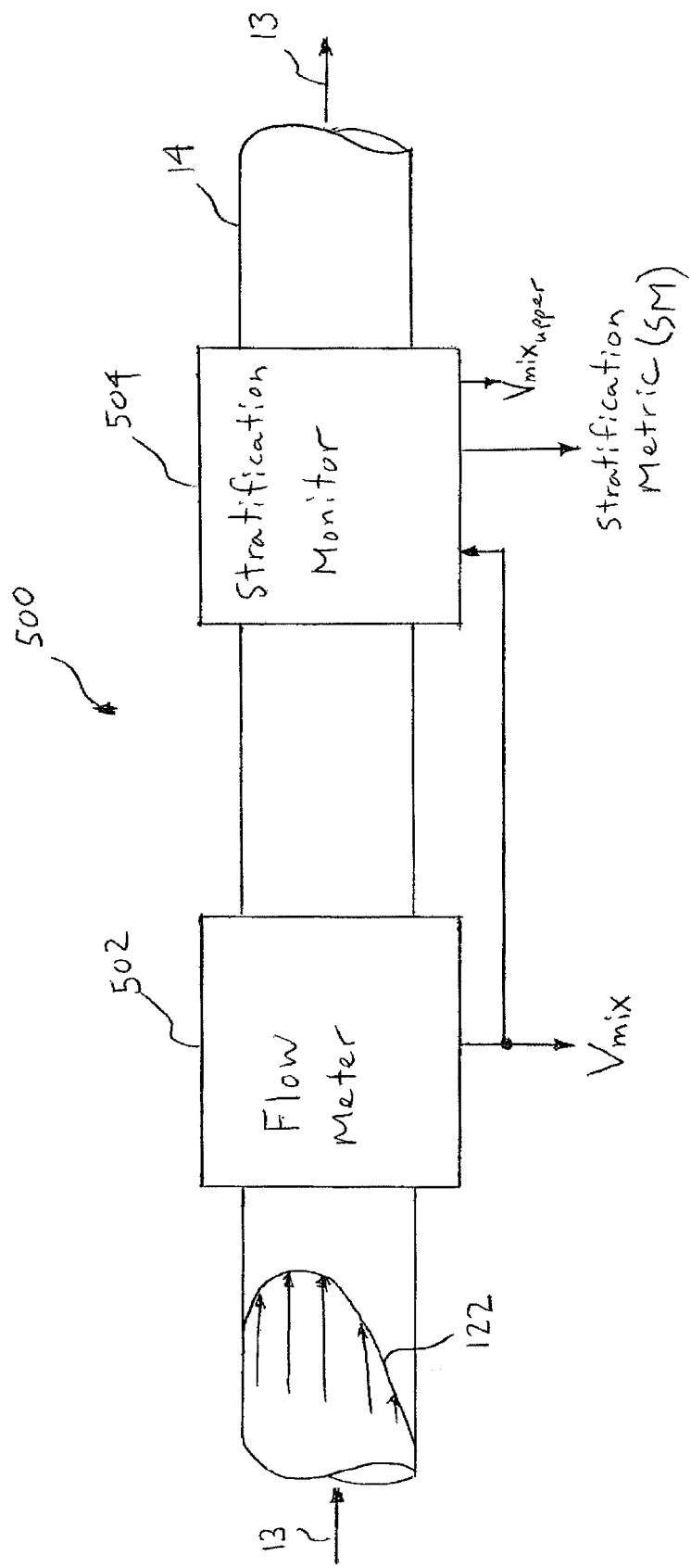
FIG. 22 depicts a block diagram of an apparatus for providing a metric indicative of the stratification of the stratification of the multiphase fluid within a pipe, in accordance with the present invention.

As shown in FIG. 22, a stratification monitoring system 500 is shown for providing a stratification metric of a multiphase flow 13 passing through a pipe 14. The stratification metric is a parameter that is indicative of the relative stratification of the multiphase flow in the pipe at the specific location of the system. The stratification monitoring system 500 includes a flow meter 502 and a stratification monitor 504. The flow meter may be any known apparatus that measures the flow rate or average flow rate of the multiphase flow, such as a magmeter, ultrasonic flow meter, DP meter, venturi meter, wedge meter, etc. The stratification monitor measures the flow rate of the portion of the multiphase flow flowing at or near the upper portion (e.g., top) of the pipe. The flow meter provides a velocity of the fluid (Vmix) at approximately the center portion of the pipe, while the stratification monitor provides the velocity of the fluid ($Vmix_{upper}$) at the upper portion of the pipe. The difference between $Vmix_{upper}$ and Vmix provides a stratification metric (SM), and therefore, the greater the difference between the velocities the greater the stratification metric, and vice versa.

Figure 23:
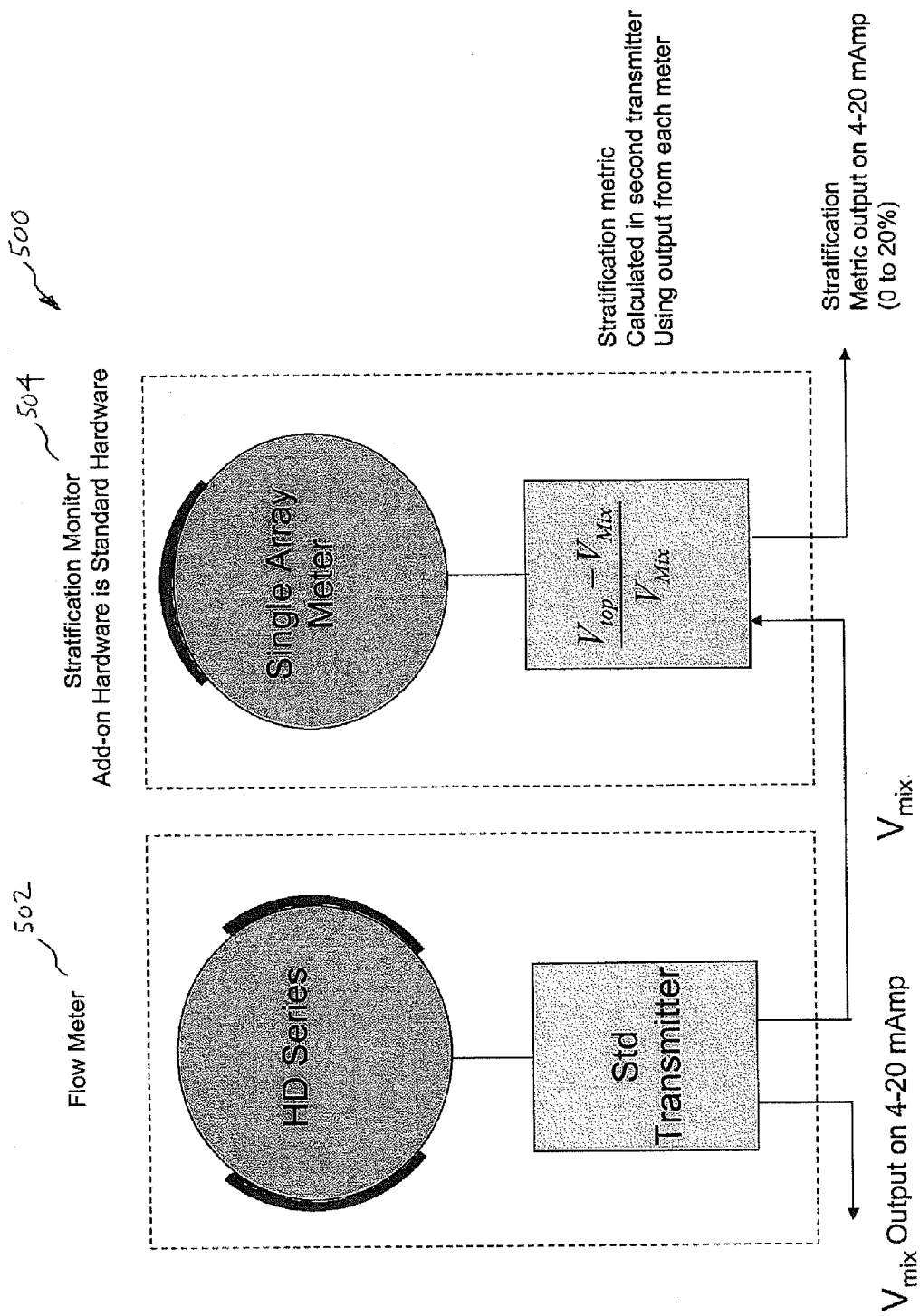
FIG. 23 depicts an illustrative diagram of the apparatus of FIG. 22, in accordance with an embodiment of the present invention.
Figure 24:
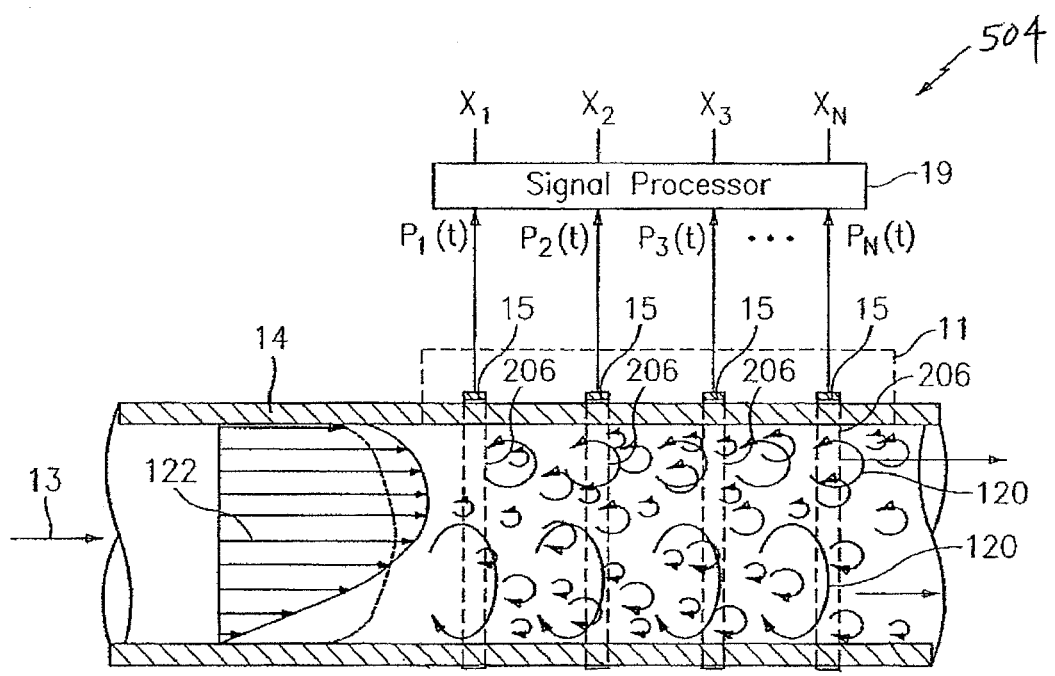
FIG. 24 depicts a longitudinal cross-section of a stratification monitor of FIG. 22 in accordance with the present invention.
Figure 25:
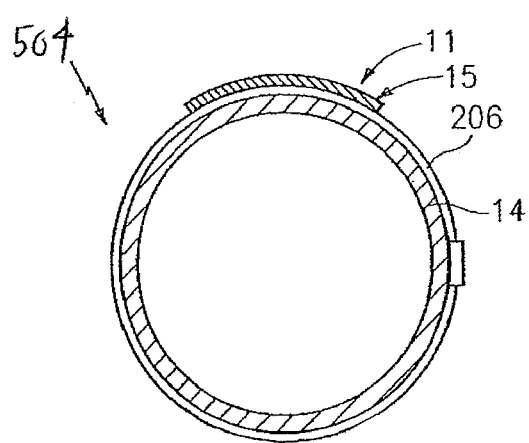
FIG. 25 depicts a transverse (radial) cross-section of the embodiment of FIG. 24.

Referring to FIG. 23, an embodiment of the present invention is shown. The flow meter is similar to that shown and described in FIGS. 20 and 21, wherein the configuration of the sensors measures the flow rate of the multiphase fluid at approximately the center portion of the pipe. As best shown in FIGS. 23-25, the stratification monitor comprises an array of sensors disposed different axial locations along the pipe, similar to the array of sensors described hereinbefore. The array of sensors provides the velocity at or near the top of the pipe as described hereinbefore. The signals received from each sensor are processed using array processing as described hereinbefore. Alternatively, the sensor signals may be processed using cross-correlation techniques similar to that shown in U.S. Pat. Nos. 6,354,147, 6,450,037, 6,691,584, and 6,889,562, which are incorporated herein by reference.

Figure 26:
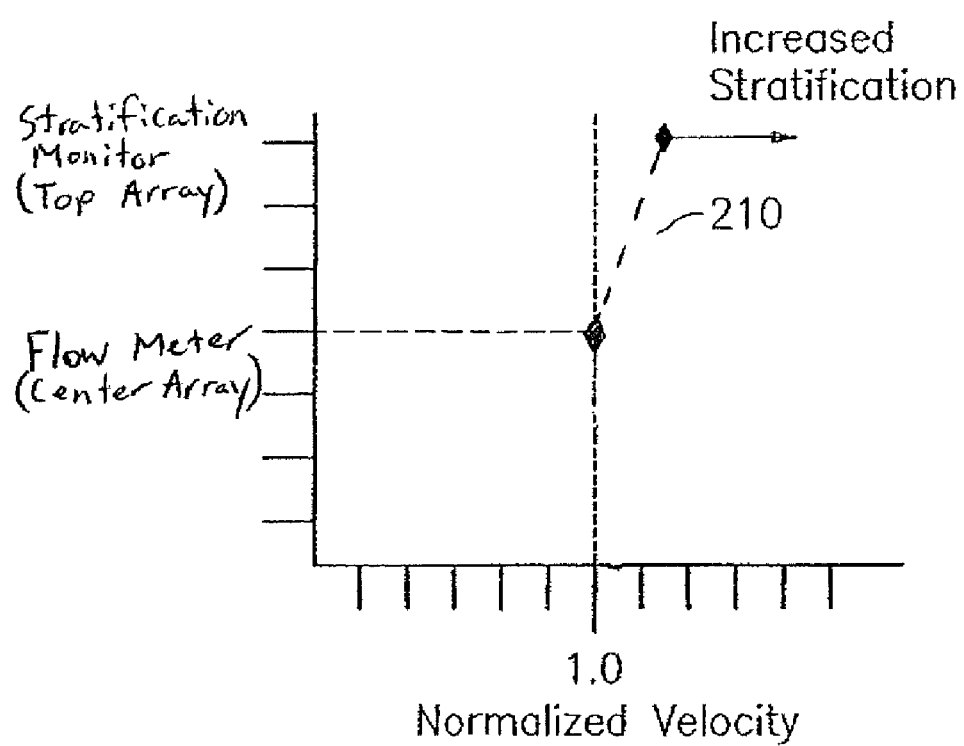
FIG. 26 depicts a plot of the normalized velocity for the top array and the middle array in the embodiment of FIG. 24.

FIG. 26 depicts a plot of the normalized velocity for the top array (the stratification monitor) and the middle array (the flow meter) in the embodiment of FIG. 24. As illustrated, as stratification of the fluid increases, the difference of the velocities increase, hence the slope of the line 210 increases. Conversely, as stratification of the fluid decreases, the difference of the velocities decrease, hence the slope of the line 210 decreases.

Figure 27:
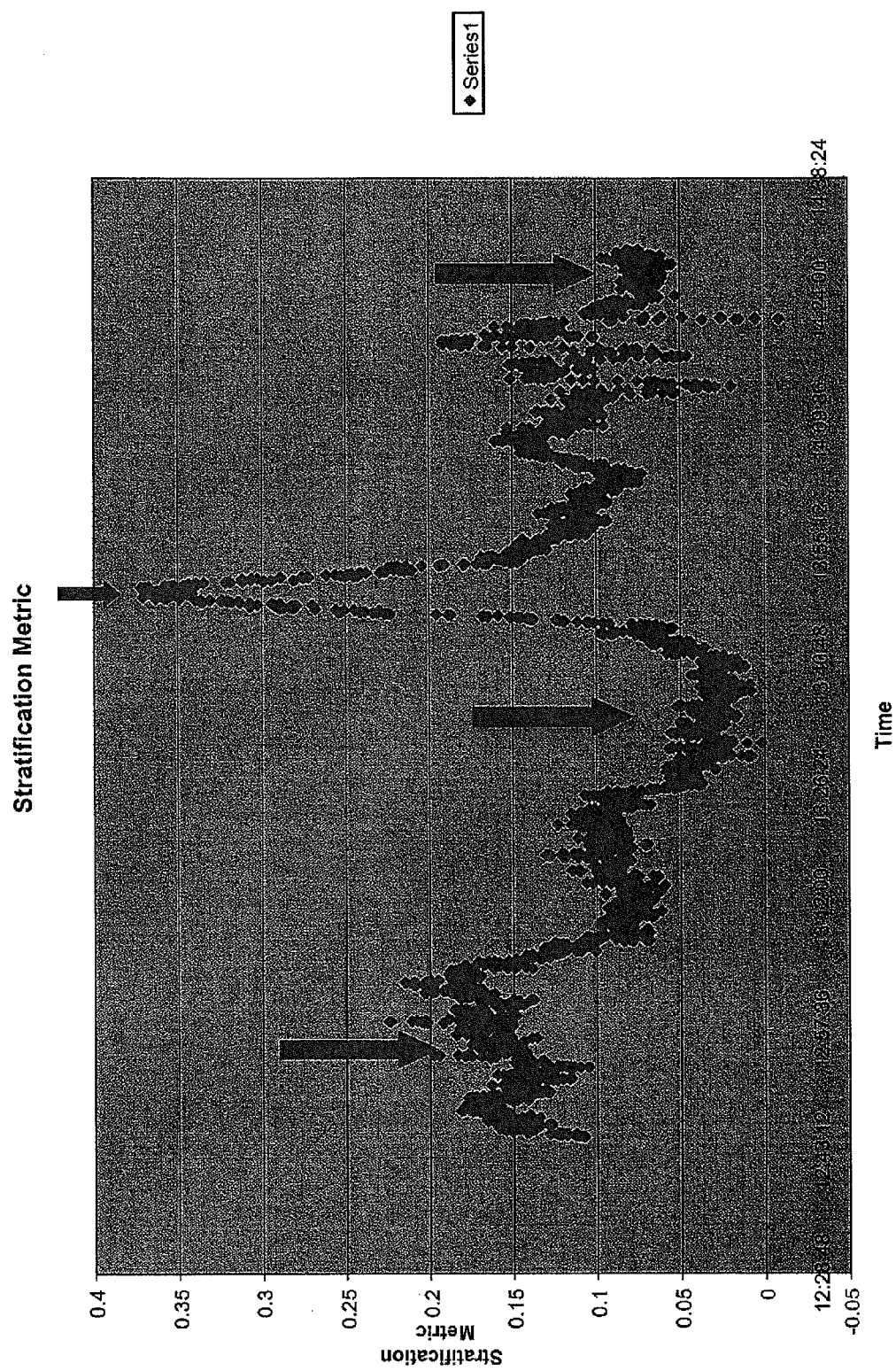
FIG. 27 depicts a plot of a stratification metric as a function of time provided an apparatus embodying the present invention.
Figure 28:
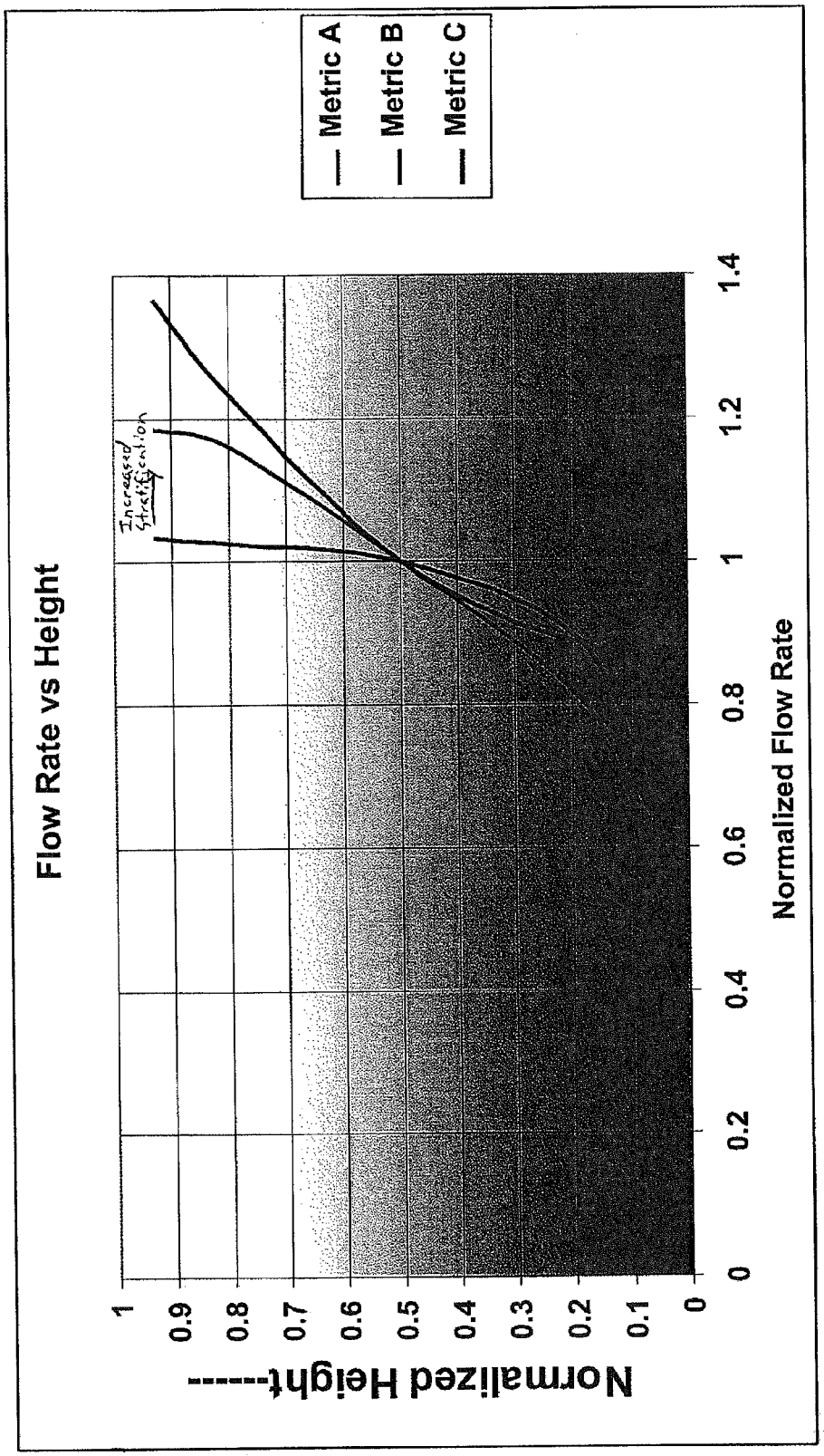
FIG. 28 depicts a plot of the normalized flow rate of three different multiphase fluid flowing in a pipe at different heights with the pipe in accordance with the present invention.
Figure 29:
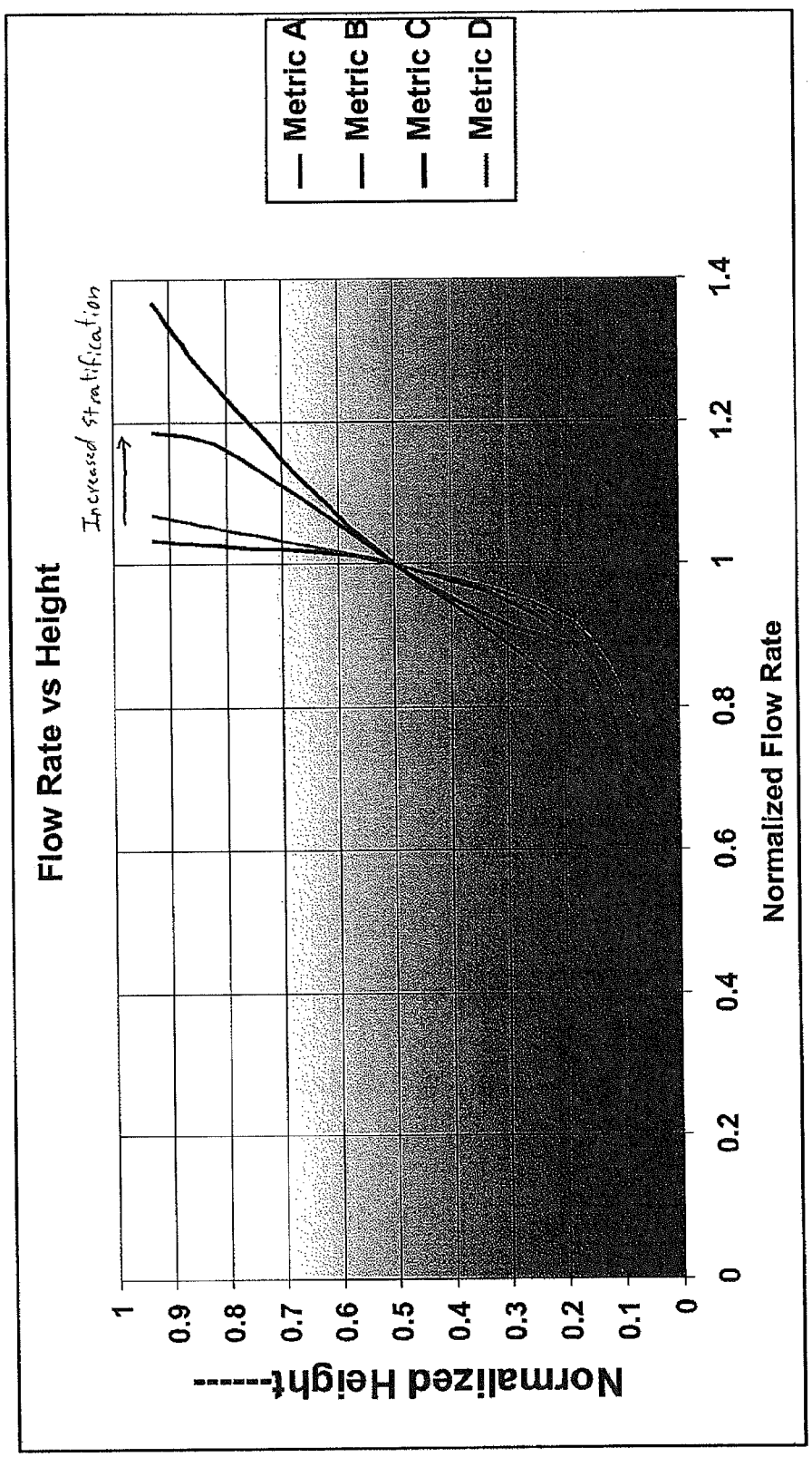
FIG. 29 depicts a plot of the normalized flow rate of four different multiphase fluid flowing in a pipe at different heights with the pipe in accordance with the present invention.

FIG. 27 shows a plot of the measured stratification metric over a period of time. As shown, the stratification of the fluid changed during this time period. FIGS. 28 and 29 illustrate a plurality of stratification profiles of data taken with a flow meter similar to that shown in FIGS. 17 and 18. One should note that the change of the stratification profile from the midpoint of the pipe to the upper portion of the pipe is relative linear with changing stratification as compared to the lower portion of the pipe. Therefore, it is advantageous to simply measure the stratification in the mid to upper portion of the pipe to determine a stratification metric. While this configuration has its advantages, one will appreciate that the upper sensors do not have to be at the uppermost portion (top) of the pipe. The upper sensors should be disposed sufficiently above the location that where fluid is flowing at the velocity measured by the flow meter. Similarly, the center sensors do not have to be at the center portion of the pipe.

Figure 30:
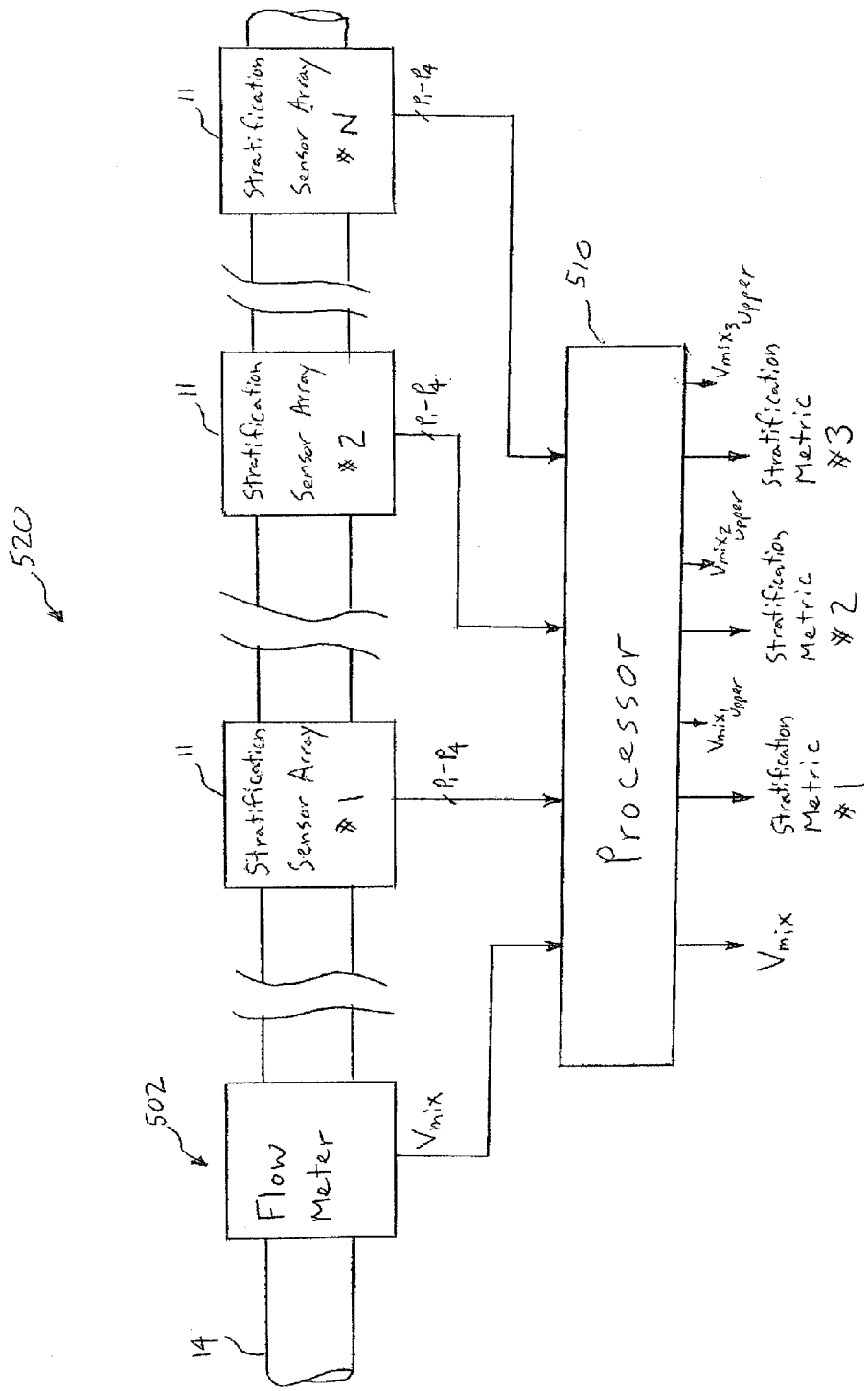
FIG. 30 depicts a functional block diagram of a system for measuring the stratification metric at different locations along a pipeline in accordance with the present invention.

FIG. 30 illustrates a system 520 for measuring the relative stratification of the multiphase flow at different locations of a pipeline. Similar to that described hereinbefore in FIGS. 22-29, the system includes a flow meter 502 and a plurality of stratification sensor arrays #1-#N 11 disposed at different locations along the pipe 14. The stratification sensor arrays may be located at any location on the pipeline to determine a relative measurement of the stratification of the fluid at particular location on the pipeline. The velocity provided by the flow meter and the sensor signals of each stratification sensor array is provided to a processor 510. The processor determines the velocity of the upper portion of the flow, using the sensor signals, at each respective location of the sensor heads. The processor then compares the flow velocity provided by the flow meter with each respective upper velocity at each respective location of the stratification sensor arrays and provide a respective stratification metric for each location.

One skilled in the art will appreciate that the flow meter and stratification monitors are not required to be disposed adjacent or near each other to function as intended. Further, the flow meter may be disposed anywhere on the pipe irrespective of the locations of the stratification monitors.

While the processing of the sensor signals and flow meter to be provided by the stratification monitor or a separate processor, one will appreciate that the processing of the sensor signals and/or velocity measurements may be performed by any of the flowmeter, stratification monitors, and/or separate monitor.

In any of the embodiments described herein, the sensors 15 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor and the pipe 14. The sensors 15 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 14. If desired, for certain applications, gratings may be detached from (or strain or acoustically isolated from) the pipe 14 if desired. It is also contemplated that any other strain sensing technique may be used to measure the variations in strain in the pipe 14, such as highly sensitive piezoelectric, electronic or electric, strain gages attached to or embedded in the pipe 14.

In various embodiments of the present invention, a piezoelectronic pressure transducer may be used as one or more of the pressure sensors and it may measure the unsteady (or dynamic or ac) pressure variations inside the pipe 14 by measuring the pressure levels inside the pipe. In one embodiment of the present invention, the sensors 14 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The sensors 15 may incorporate a built-in MOSFET microelectronic amplifier to convert the high-impedance charge output into a low-impedance voltage signal. The sensors 15 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore it is contemplated that each of the sensors 15 may include a piezoelectric sensor that provides a piezoelectric material to measure the unsteady pressures of the flow 13. The piezoelectric material, such as the polymer, polarized fluoropolymer, PVDF, measures the strain induced within the process pipe 14 due to unsteady pressure variations within the flow 13. Strain within the pipe 14 is transduced to an output voltage or current by the attached piezoelectric sensors 15.

The PVDF material forming each piezoelectric sensor 15 may be adhered to the outer surface of a steel strap that extends around and clamps onto the outer surface of the pipe 14. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140 C) (co-polymers)

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein. In addition, it is contemplated that, while the embodiments described herein are useful for flow having dispersive properties (e.g., stratified flow), the embodiments described herein can also be used for homogeneous flow with no dispersive properties.

Although the invention has been described and illustrated with respect to exemplary embodiments thereof, the foregoing and various other additions and omissions may be made therein and thereto without departing from the spirit and scope of the present invention.

What is claimed is:

1. An apparatus for determining a level of stratification of a multiphase fluid flow passing through a pipe, the apparatus comprising:
    a flow meter operable to determine a flow velocity of the multiphase fluid flow passing through a first radial region of the pipe;
    at least one sensor array having a plurality of sensors, wherein each sensor within the array is spaced apart from the other sensors within the array and is disposed at an axial location along the pipe different from the axial location of each other sensor within the array, and wherein each of the sensors in the array is operable to produce signals indicative of pressure created by coherent structures convecting with the fluid flow along a second radial region of the pipe, wherein the second radial region is above the first radial region; and
    a signal processor operable to determine from the signals a flow velocity of a portion of the multiphase fluid flow passing within the second radial region of the pipe, and to compare the flow velocity from the first radial region and flow velocity from the second radial region to determine information indicative of the stratification of the multiphase fluid flow.

2. The apparatus of claim 1, wherein the apparatus includes a plurality of sensor arrays, each spaced apart from the others on the pipe; and
    wherein the signal processor is operable to compare the flow velocity from the first radial region aligned with the flow meter to the flow velocity from the second radial region of the pipe aligned with each sensor array, to determine information indicative of the stratification of the multiphase fluid flow passing each sensor array.

3. The apparatus of claim 1, wherein the flow meter is operable to determine an average flow velocity of the multiphase fluid flow.

4. The apparatus of claim 1, wherein the first radial region is aligned with the center of the pipe.

5. A method for determining a level of stratification of a multiphase fluid flow passing through a pipe, comprising the steps of:
   determining a flow velocity of the multiphase fluid flow passing through a first radial region of the pipe using a flow meter;
   determining a flow velocity of a portion of the multiphase fluid flow passing within a second radial region of the pipe using at least one sensor array having a plurality of sensors, wherein the second radial region is above the first radial region;
   comparing the flow velocity from the first radial region and the flow velocity from the second radial region using a processor;
   determining, from the comparison of the flow velocity from the first radial region and the flow velocity from the second radial region, the level of stratification of the multiphase fluid flow passing through the pipe using the processor; and
   providing information indicative of the determined level of stratification of the multiphase fluid flow.

6. The method of claim 5, wherein the step of determining a flow velocity of the multiphase fluid flow passing through a first radial region of the pipe comprises determining an average flow velocity of the multiphase fluid flow.

7. The method of claim 5, wherein the first radial region is aligned with a center of the pipe.

8. The method of claim 5, wherein the step of determining the flow velocity of a portion of the multiphase fluid flow passing within a second radial region of the pipe comprises sensing coherent structures convecting with the multiphase fluid flow within the second radial region of the pipe.

9. The method of claim 8, wherein the coherent structures are sensed using at least one sensor array having a plurality of sensors, wherein each sensor within the array is spaced apart from the other sensors within the array and is disposed at an axial location along the pipe different from the axial location of each other sensor within the array.

10. The method of claim 5, wherein the step of determining the flow velocity of a portion of the multiphase fluid flow passing within the second radial region of the pipe, is performed at a plurality of axial locations along the pipe.

11. The method of claim 10, wherein the step of determining the flow velocity of a portion of the multiphase fluid flow passing within a second radial region of the pipe comprises sensing coherent structures convecting with the multiphase fluid flow within the second radial region of the pipe at each of the plurality of axial locations.

12. The method of claim 11, wherein the coherent structures are sensed at each axial location using a sensor array having a plurality of sensors, wherein each sensor within the array is spaced apart from the other sensors within the array and is disposed at an axial location along the pipe different from the axial location of each other sensor within the array.

* * * * *